(12) United States Patent
Pu et al.

(10) Patent No.: US 11,163,153 B1
(45) Date of Patent: Nov. 2, 2021

(54) ADJUSTING NOTCH FREQUENCY OF ADAPTIVE NOTCH FILTER TO TRACK RESONANT FREQUENCY OF SLOW SCAN MICROELECTROMECHANICAL SYSTEMS (MEMS) MIRROR

(71) Applicant: Microsoft Technology Licensing, LLC, Redmond, WA (US)

(72) Inventors: Chuan Pu, Foster City, CA (US); Wenjun Liao, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 16/403,471

(22) Filed: May 3, 2019

(51) Int. Cl.
  *G02B 26/10* (2006.01)
  *G06F 17/14* (2006.01)
  *G02B 26/08* (2006.01)

(52) U.S. Cl.
  CPC ....... *G02B 26/101* (2013.01); *G02B 26/0833* (2013.01); *G06F 17/142* (2013.01)

(58) Field of Classification Search
  CPC .. G02B 26/101; G02B 26/0833; G06F 17/142
  See application file for complete search history.

(56) References Cited

U.S. PATENT DOCUMENTS

| | | | | |
|---|---|---|---|---|
| 6,703,603 B2* | 3/2004 | Tohyama | ............. | G02B 7/1821 250/234 |
| 6,995,622 B2* | 2/2006 | Partridge | ................ | H03L 1/022 331/66 |
| 8,059,322 B1* | 11/2011 | Brown | ............... | G02B 26/0833 359/199.1 |
| 9,581,447 B2* | 2/2017 | Ackerman | ......... | G01C 19/5776 |
| 2010/0321750 A1* | 12/2010 | Burinskiy | ................ | G09G 3/02 359/198.1 |

* cited by examiner

*Primary Examiner* — Robert E. Tallman
(74) *Attorney, Agent, or Firm* — Wade IP Law PLLC

(57) ABSTRACT

Techniques are described herein that are capable of adjusting a notch frequency of an adaptive notch filter ("filter") to track a resonant frequency of a slow scan MEMS mirror ("mirror"). For instance, an adaptive feedback may be configured to determine one or more resonant frequencies of the mirror based at least in part on a frequency response of an output signal that is proportional to movement of the mirror. The adaptive feedback may be further configured to adjust at least one notch frequency of the filter to track at least one respective resonant frequency of the mirror. The filter may be configured to modify a magnitude of a frequency response of a combination of the filter and the mirror to be substantially constant by suppressing the at least one notch frequency in a frequency response of the mirror.

20 Claims, 17 Drawing Sheets

… … …

ADJUSTING NOTCH FREQUENCY OF ADAPTIVE NOTCH FILTER TO TRACK RESONANT FREQUENCY OF SLOW SCAN MICROELECTROMECHANICAL SYSTEMS (MEMS) MIRROR

BACKGROUND

Some display devices form displayed images by using mirrors to direct a laser beam onto a display region. The mirrors may move over the course of a frame to control the location in the display region toward which the laser beam is directed. Such display devices often include a fast scan microelectromechanical systems (MEMS) mirror and a slow scan MEMS mirror. The fast scan MEMS mirror typically oscillates about a first axis under resonance. The slow scan MEMS mirror typically oscillates about a second axis that is perpendicular to the first axis to scan linearly. In this manner, the fast scan MEMS mirror and the slow scan MEMS mirror can perform a raster scan of the laser beam onto the display region. Resonance of the fast scan MEMS mirror increases the efficiency with which the fast scan MEMS mirror operates; whereas, resonance of the slow scan MEMS mirror negatively impacts linearity of the slow scan MEMS mirror.

SUMMARY

Various approaches are described herein for, among other things, adjusting a notch frequency of an adaptive notch filter to track a resonant frequency of a slow scan MEMS mirror. A notch frequency of a notch filter is a frequency that the notch filter is configured to suppress (e.g., attenuate). A resonant frequency of a slow scan MEMS mirror is a frequency at which the slow scan MEMS mirror resonates. For instance, a magnitude of a frequency response of the slow scan MEMS mirror may be a relative maximum at the resonant frequency. An adaptive notch filter is a notch filter having a notch frequency that is adjustable.

In an example approach, an adaptive display control system includes a slow scan MEMS mirror, an adaptive feedback, and an adaptive notch filter. The slow scan MEMS mirror is configured to move about an axis. The adaptive feedback is configured to determine one or more resonant frequencies of the slow scan MEMS mirror based at least in part on a frequency response of an output signal that is proportional to movement of the slow scan MEMS mirror. The adaptive feedback is further configured to adjust at least one notch frequency of one or more notch frequencies of the adaptive notch filter to track at least one respective resonant frequency of the one or more resonant frequencies of the slow scan MEMS mirror. The adaptive notch filter is configured to modify a magnitude of a frequency response of a combination of the adaptive notch filter and the slow scan MEMS mirror to be substantially constant (e.g., flat) by suppressing the at least one notch frequency in a frequency response of the slow scan MEMS mirror.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 7-8, 13-14, and 17 depict flowcharts of example methods for adjusting at least one notch frequency of an adaptive notch filter to track at least one respective resonant frequency of a slow scan MEMS mirror in accordance with embodiments.

Figure 6:
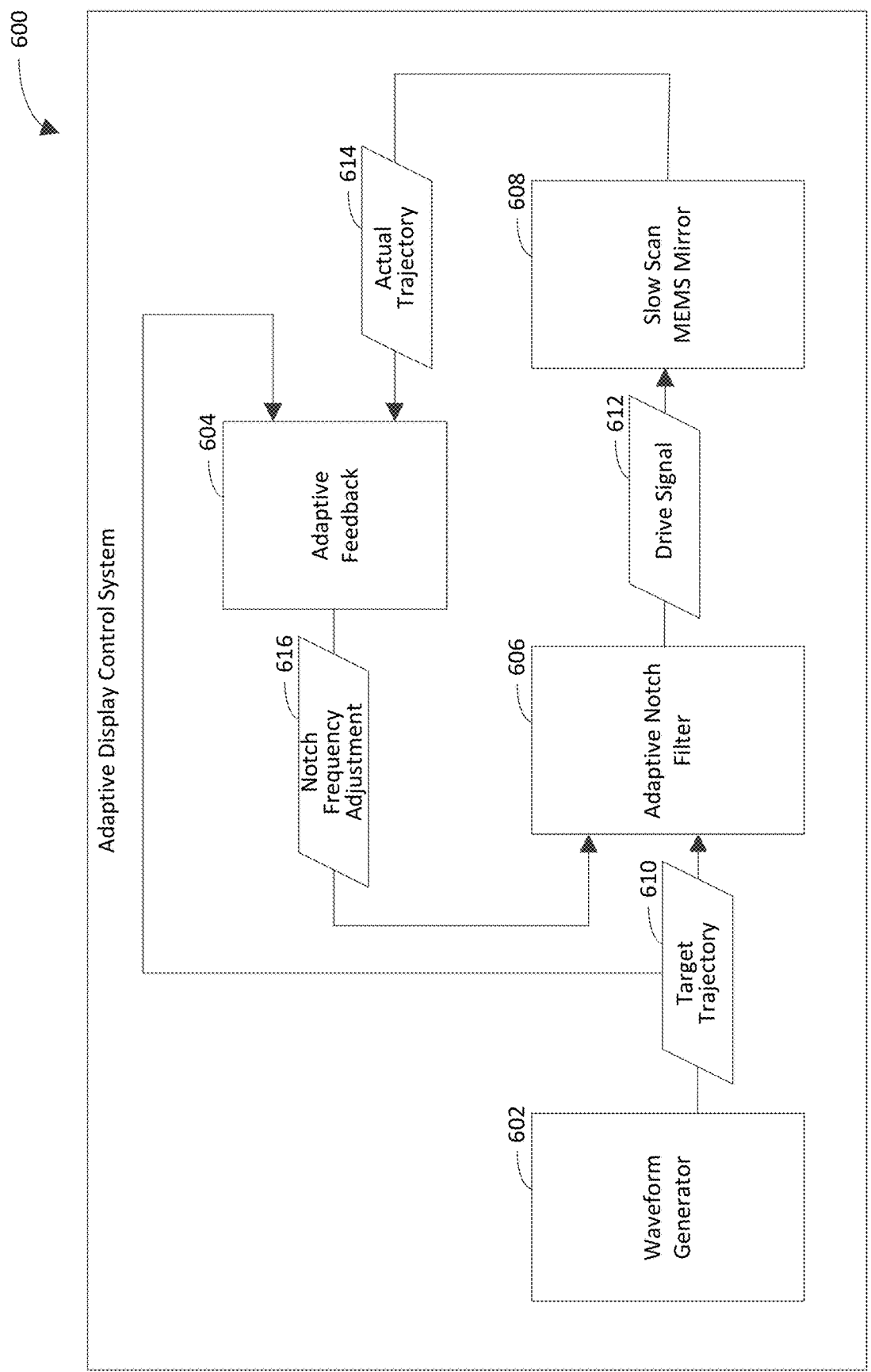
FIG. 6 is a block diagram of an example adaptive display control system in accordance with an embodiment.
Figure 9:
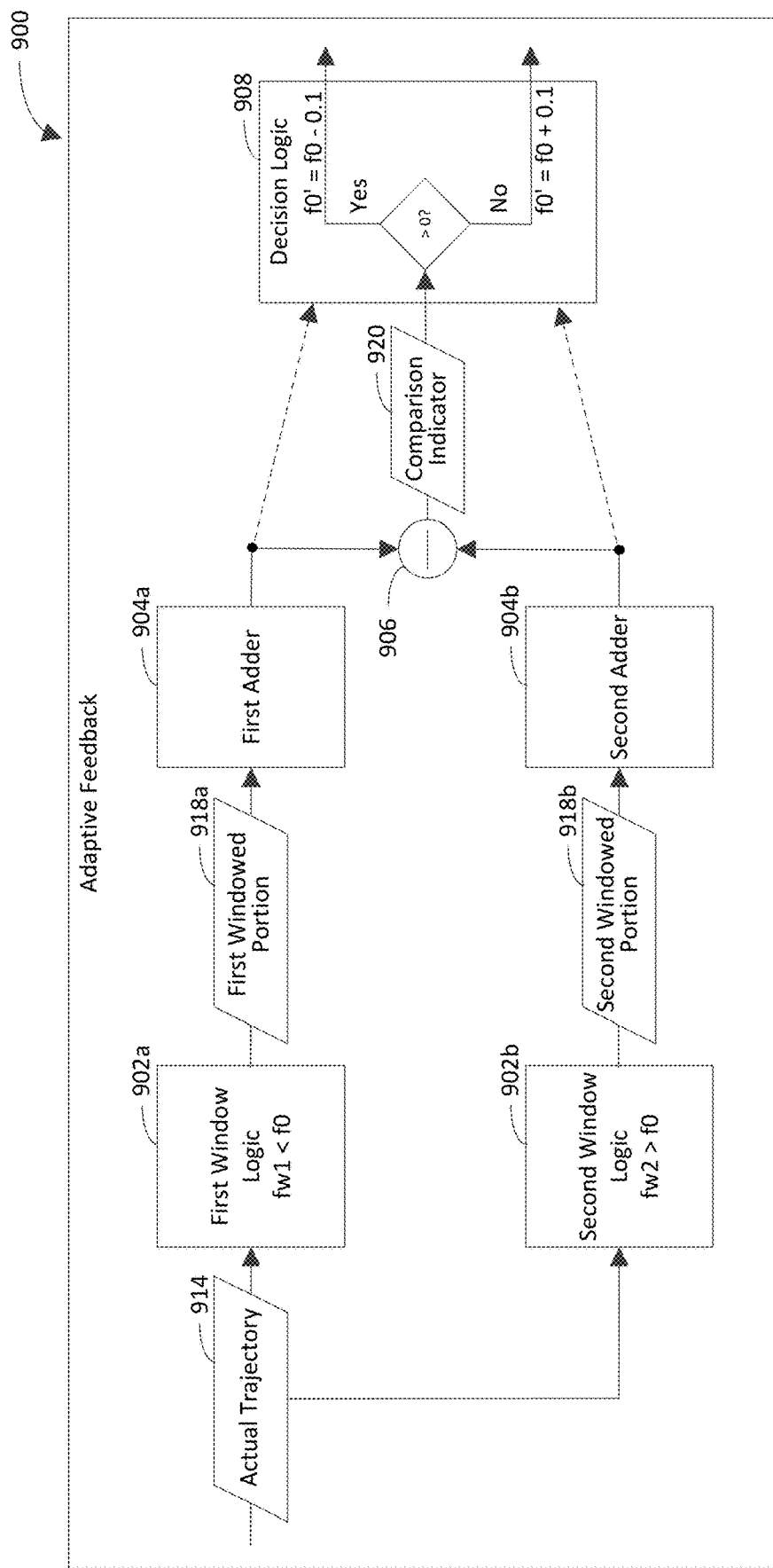

FIG. 9 is a block diagram of an example implementations of an adaptive feedback shown in FIG. 6 in accordance with embodiments.

Figure 10:
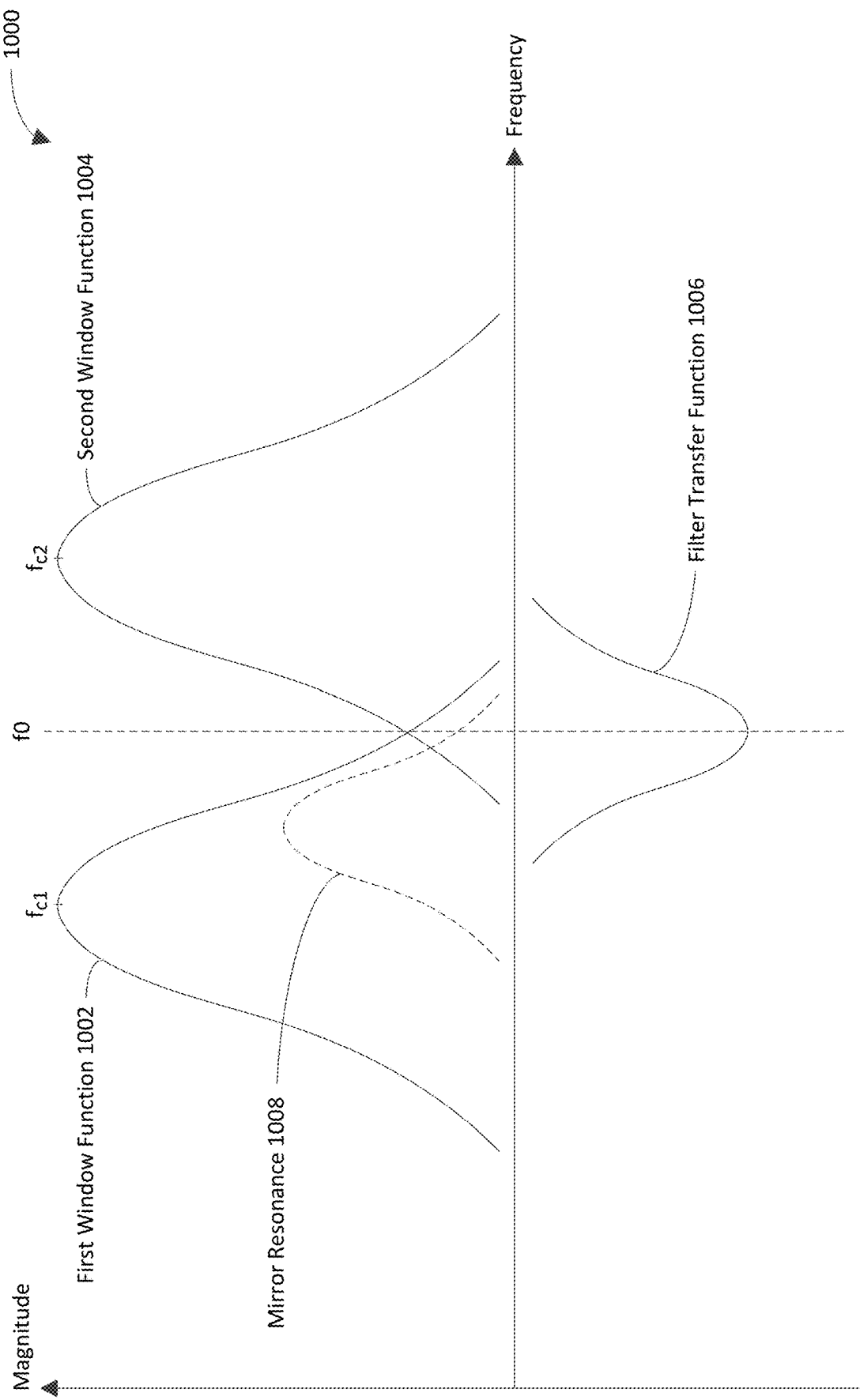
Figure 11:
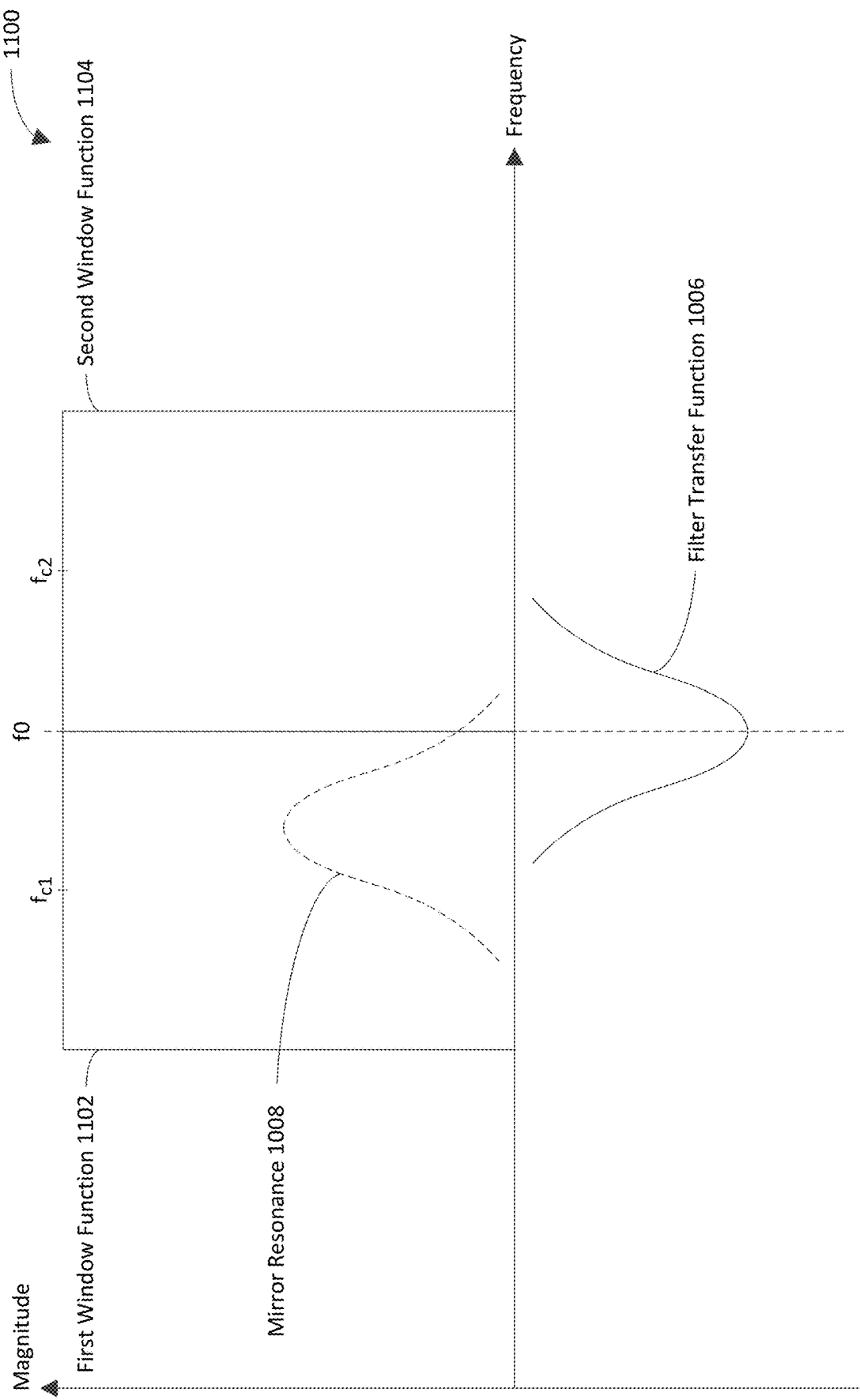
Figure 12:
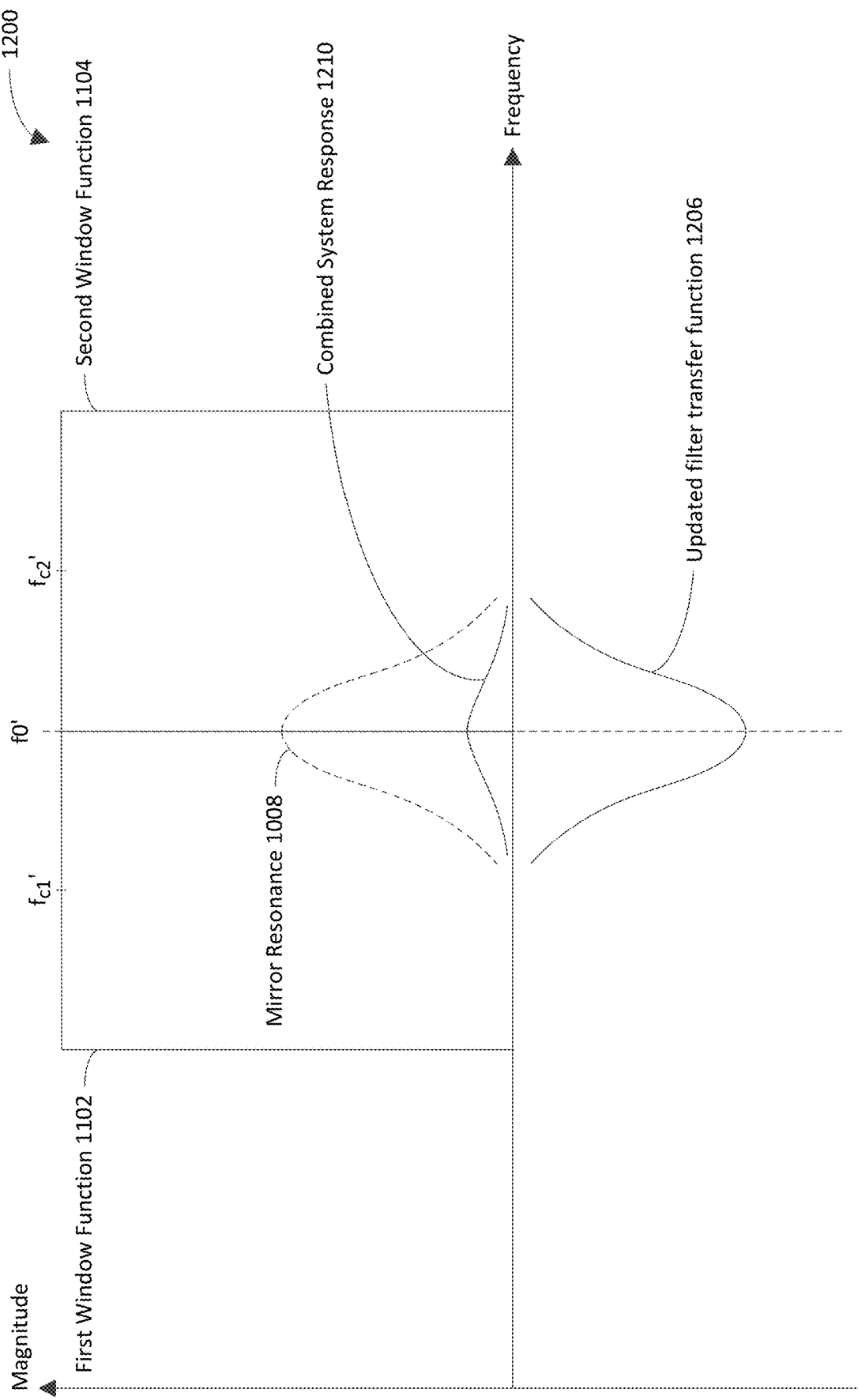

FIGS. 10-12 show example amplitude frequency responses for example implementations of an adaptive display control system shown in FIG. 6 in accordance with embodiments.

Figure 15:
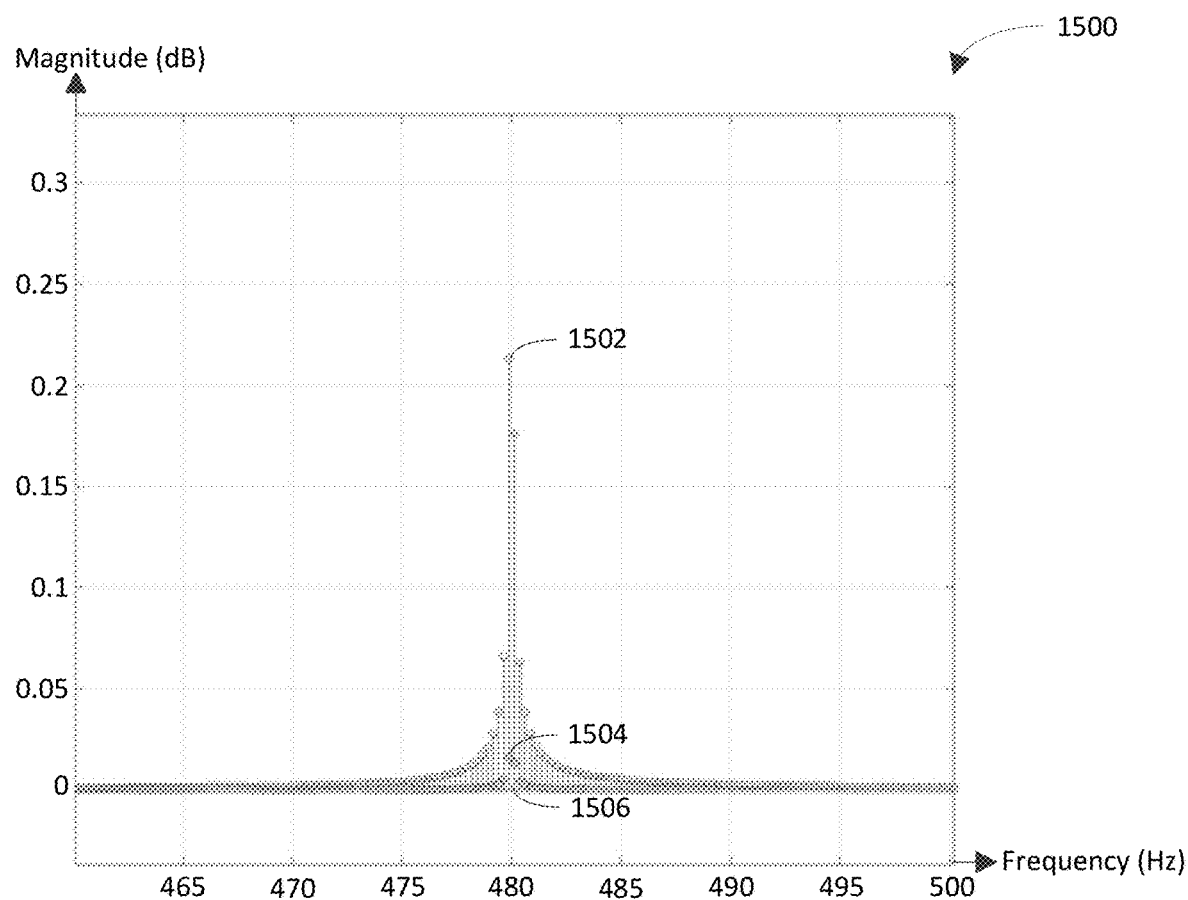

FIG. 15 shows an example magnitude frequency response around a resonance of a slow scan MEMS mirror for an initial setting of an example adaptive notch filter shown in FIG. 6 in accordance with an embodiment.

Figure 16:
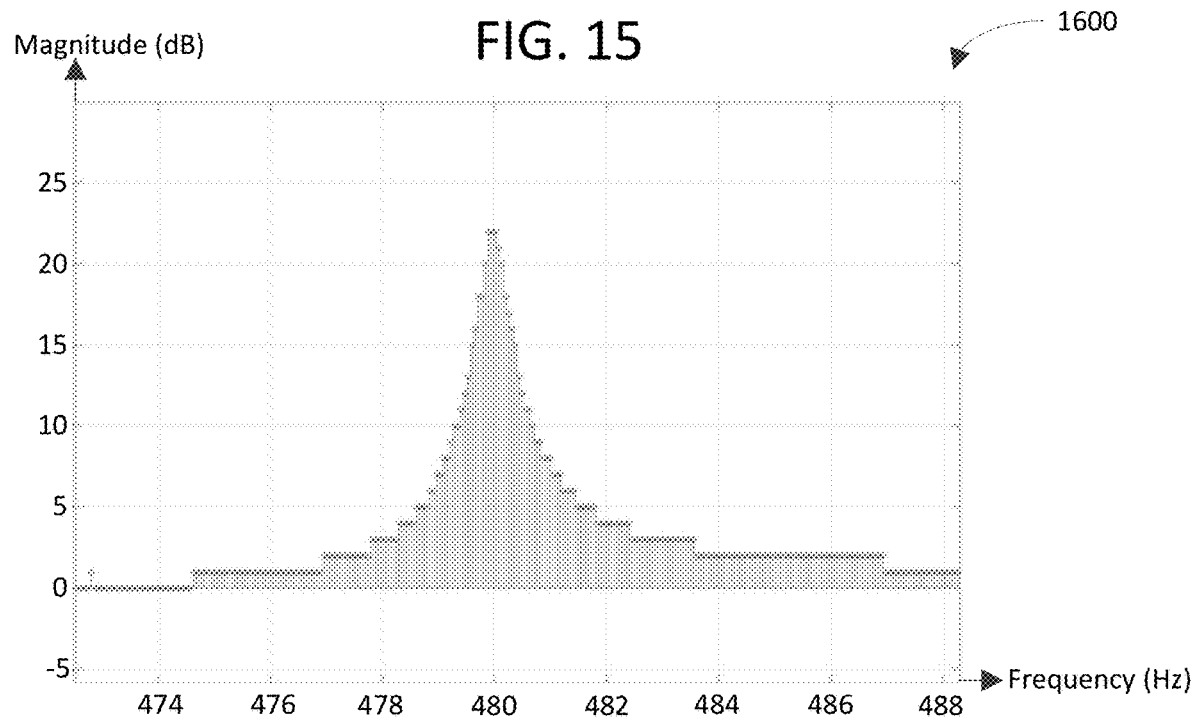

FIG. 16 illustrates an example transfer function of a combination of an adaptive notch filter and a slow scan MEMS mirror shown in FIG. 6 around a resonance of the slow scan MEMS mirror in accordance with an embodiment.

Figure 18:
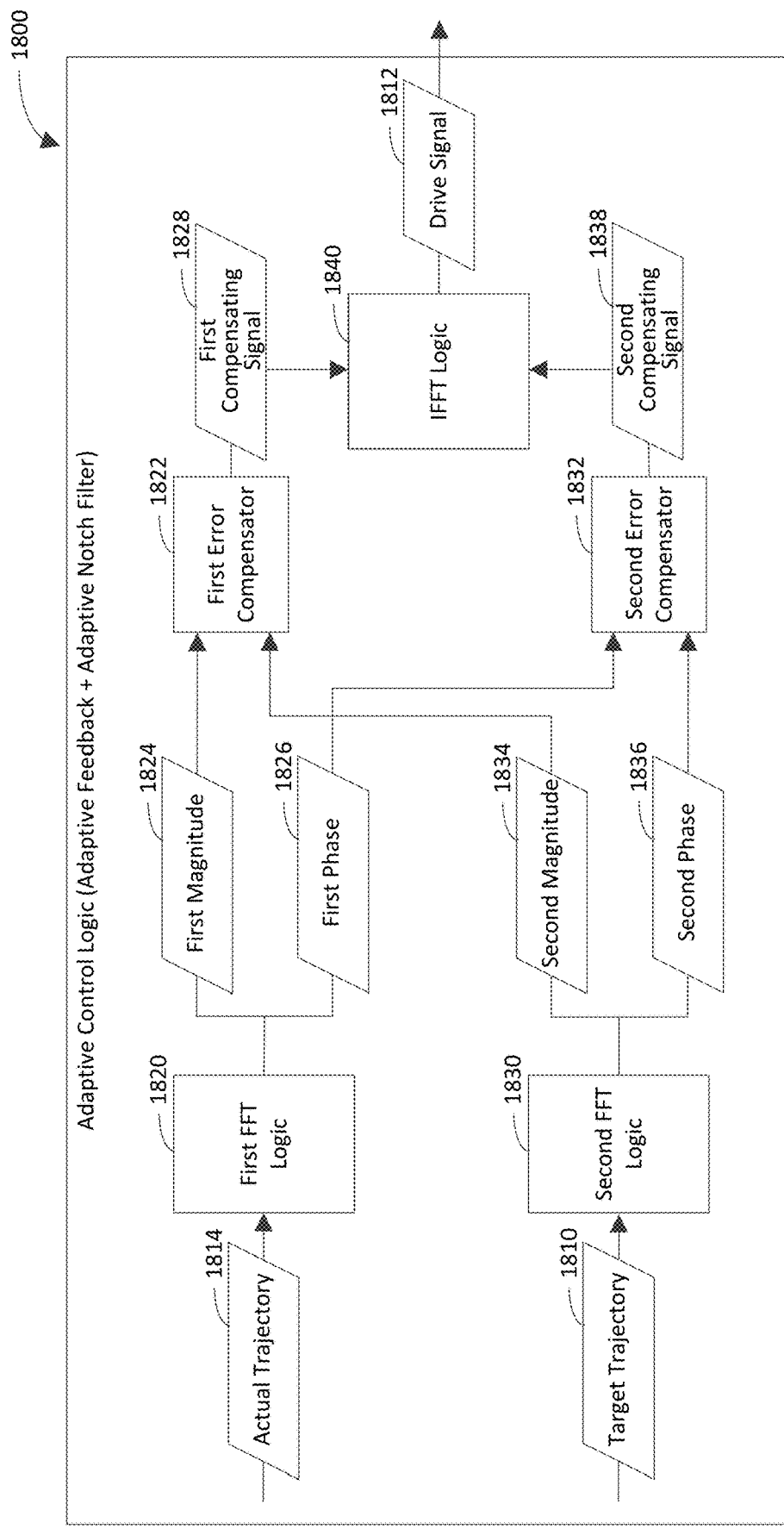

FIG. 18 is a block diagram of an example implementation of a combination of an adaptive feedback and an adaptive notch filter shown in FIG. 6 in accordance with an embodiment.

Figure 19:
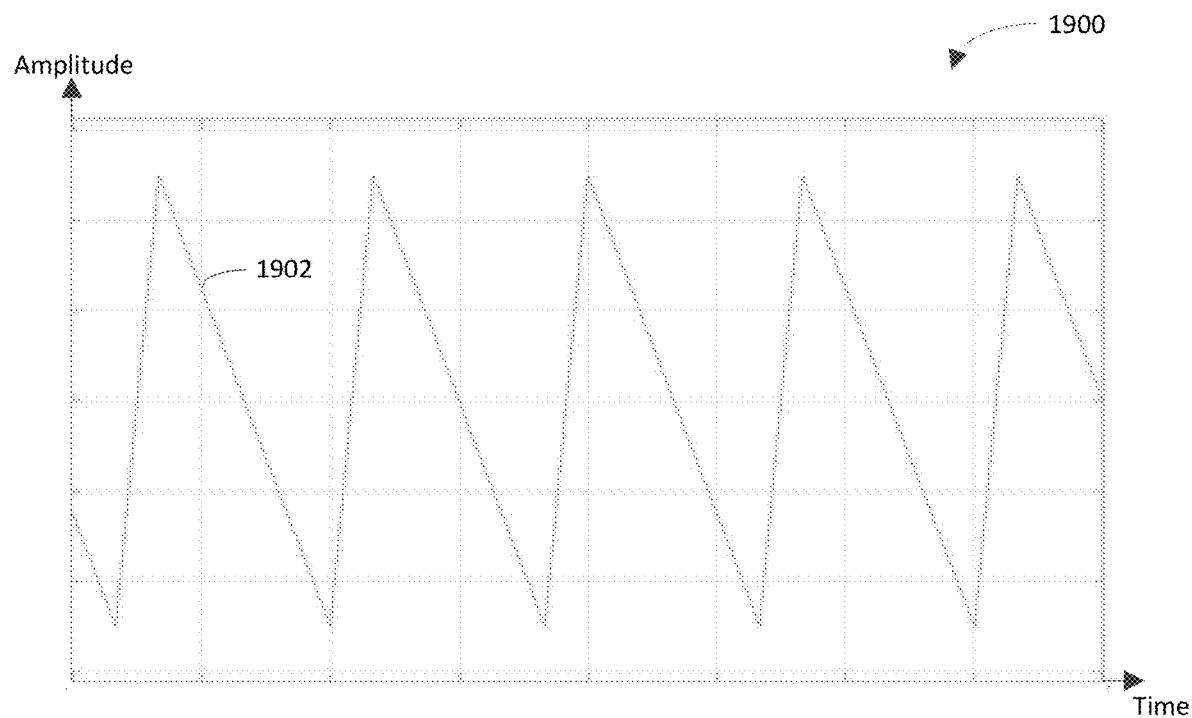

FIG. 19 is a graph showing an example plot of a target trajectory of a slow scan MEMS mirror in accordance with an embodiment.

Figure 20:
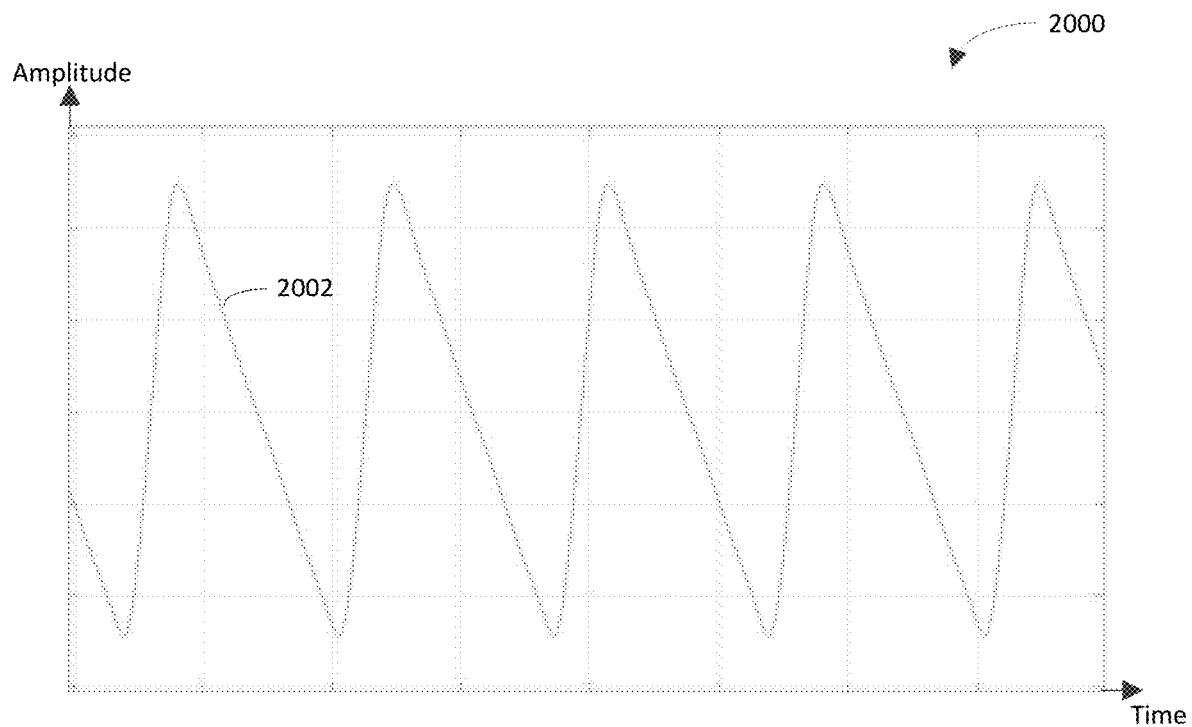

FIG. 20 is a graph showing an example plot of an actual trajectory of a slow scan MEMS mirror in accordance with an embodiment.

Figure 21:
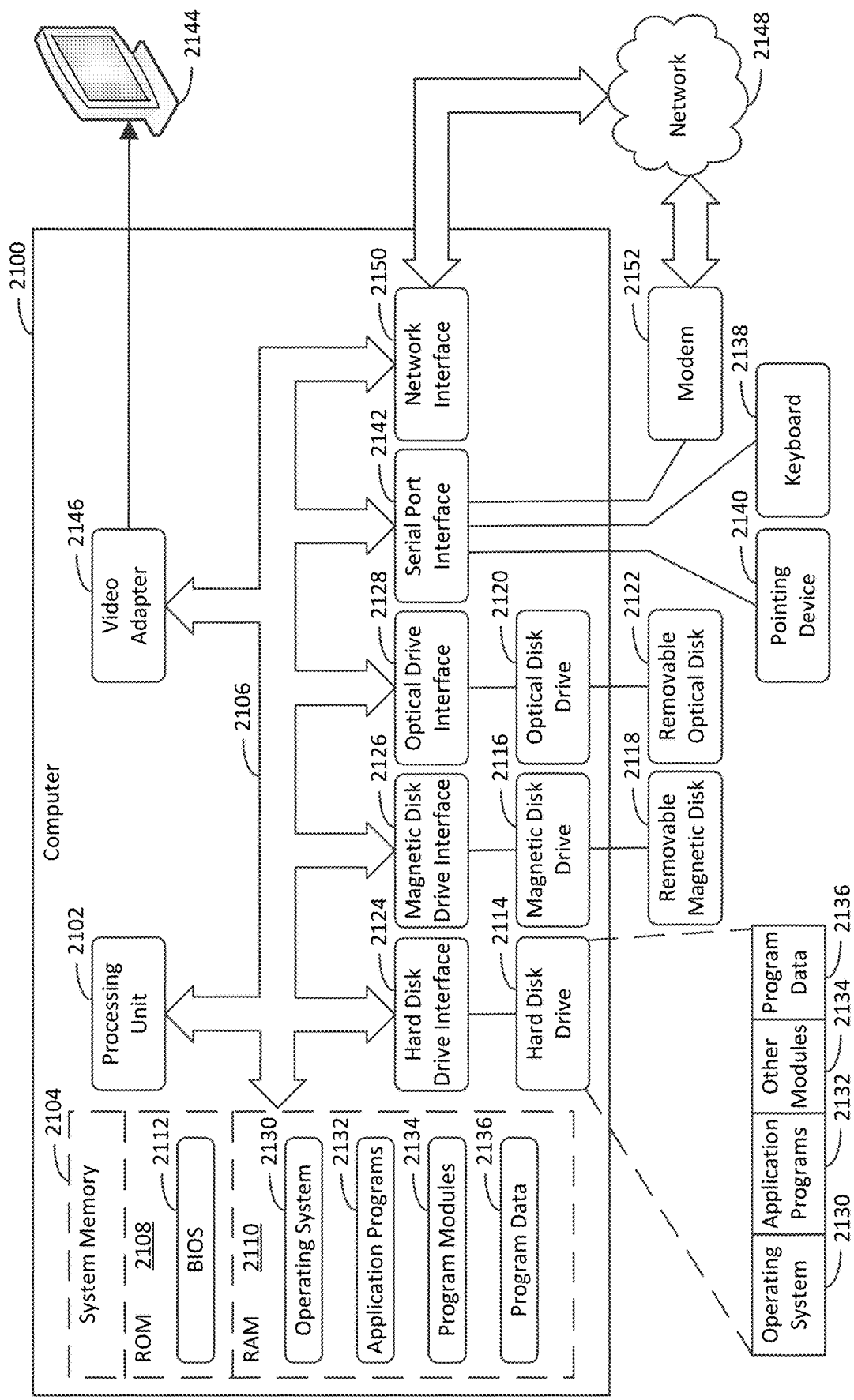

FIG. 21 depicts an example computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of adjusting a notch frequency of an adaptive notch filter to track a resonant frequency of a slow scan MEMS mirror. A notch frequency of a notch filter is a frequency that the notch filter is configured to suppress (e.g., attenuate). A resonant frequency of a slow scan MEMS mirror is a frequency at which the slow scan MEMS mirror resonates. For instance, a magnitude of a frequency response of the slow scan MEMS mirror may be a relative maximum at the resonant frequency. An adaptive notch filter is a notch filter having a notch frequency that is adjustable.

Example techniques described herein have a variety of benefits as compared to conventional techniques for suppressing a resonant frequency of a slow scan MEMS mirror. For instance, the example techniques may be capable of adjusting (e.g., automatically adjusting) a notch frequency of an adaptive notch filter to track a resonant frequency of the slow scan MEMS mirror. For instance, the notch frequency may be adjusted to compensate for changes in performance attributes (e.g., resonant frequency) of the slow scan MEMS mirror that result from changes in environmental condition(s) (e.g., temperature) of the slow scan MEMS mirror.

Adjusting the notch frequency of the adaptive notch filter in accordance with example technique(s) described herein may enable a combination of the notch filter and the slow scan MEMS mirror to maintain a substantially constant (e.g., flat) magnitude frequency response. It will be recognized that the magnitude frequency response of the combination is a magnitude of the frequency response of the combination. For example, the example technique(s) may enable non-linear frequency components of the slow scan MEMS mirror to be removed so that the combination of the notch filter and the slow scan MEMS mirror can be operated with a substantially constant magnitude frequency response at a relatively wide bandwidth. In accordance with this example, the example techniques may maximize the bandwidth over which the combination of the notch filter and the slow scan MEMS mirror are capable of operating with a substantially constant magnitude frequency response. By maintaining the substantially constant magnitude frequency response, accuracy of a displayed image that results from reflection of light from the slow scan MEMS mirror may be increased. The example techniques may increase reliability of the slow scan MEMS mirror (e.g., by stabilizing the movement of the slow scan MEMS mirror). The example techniques may increase user interaction performance. For instance, the example techniques may increase clarity of images that are generated using the slow scan MEMS mirror. The example techniques may be applied to frequency filtering and/or phase filtering of the slow scan MEMS mirror.

A slow scan MEMS mirror may be modeled as a system with multiple forced mass-damper-spring sub-systems connected in parallel. For instance, each forced mass-damper-spring sub-system may correspond to a respective resonant frequency of the slow scan MEMS mirror. An equivalent circuit for the slow scan MEMS mirror may include multiple RLC circuits. For instance, each RLC circuit may include a resistor R, an inductor L, and a capacitor C connected in series. Each RLC circuit may correspond to a respective resonant frequency of the slow scan MEMS mirror.

Figure 1:
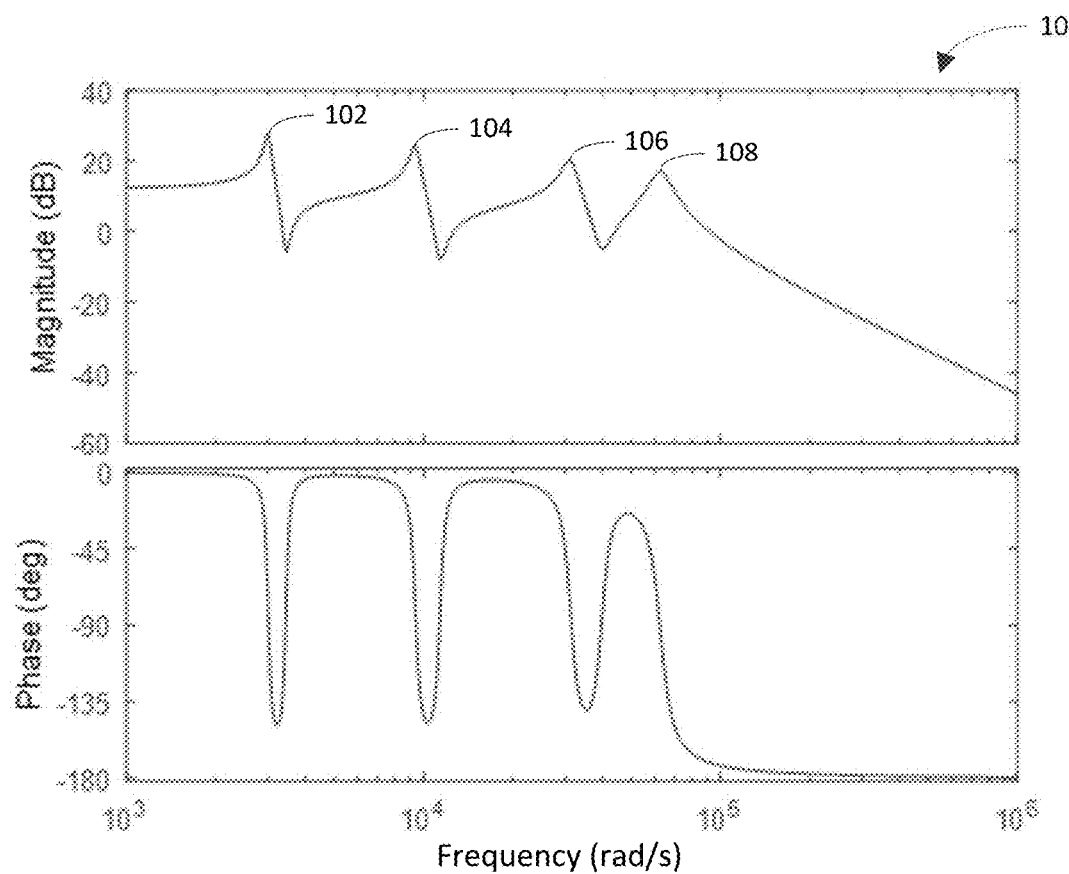
FIG. 1 shows an example frequency response (magnitude and phase) of a slow scan MEMS mirror.

FIG. 1 shows an example frequency response (magnitude and phase) 100 of a slow scan MEMS mirror. The frequency response 100 reveals that the slow scan MEMS mirror has a first resonant frequency 102, a second resonant frequency 104, a third resonant frequency 106, and a fourth resonant frequency 108. Each of the resonant frequencies 102, 104, 106, and 108 represents a resonating movement of the slow scan MEMS mirror. In one example implementation, the first resonant frequency 102 may be approximately 500 Hz, and the second resonant frequency 104 may be several kHz. The slow scan MEMS mirror is described as having four resonant frequencies for illustrative purposes and is not intended to be limiting. It will be recognized that the slow scan MEMS mirror may have any number of such resonant frequencies, and each resonant frequency may have any suitable value.

A transfer function of the slow scan MEMS mirror may be represented as follows:

$$TF(z)=TF1(z)+TF2(z)+TF3(z)+\ldots \qquad \text{(Equation 1)}$$

where TF1(z) represents the first resonance of the slow scan MEMS mirror, TF2(z) represents the second resonance of the slow scan MEMS mirror, and so on.

Figure 2:
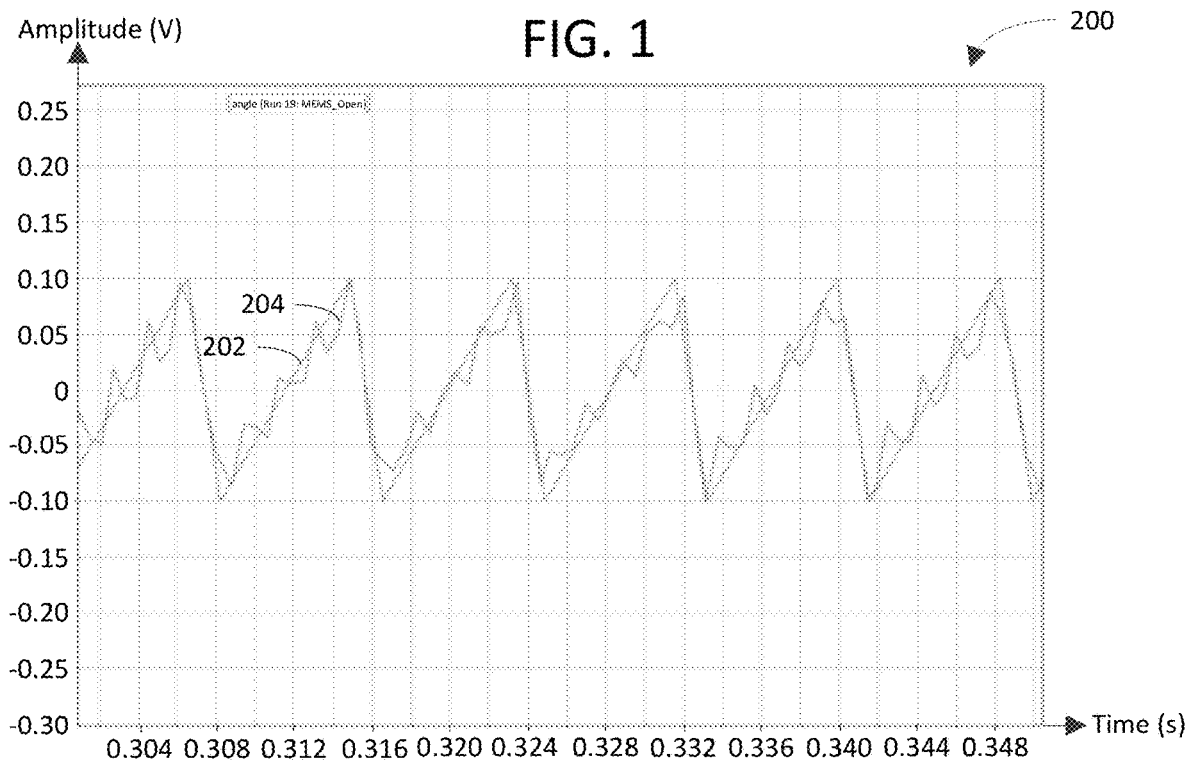
FIG. 2 is a graph showing example plots of a driving signal that drives a slow scan MEMS mirror and a response of the slow scan MEMS mirror.

FIG. 2 is a graph 200 showing example plots of a driving signal 202 that drives a slow scan MEMS mirror and a response 204 of the slow scan MEMS mirror, respectively. The driving signal 202 is shown to be an asymmetric triangle waveform for illustrative purposes and is not intended to be limiting. It will be recognized that the driving signal 202 may have any suitable shape. The asymmetric triangle waveform may be the target (e.g., desired) trajectory of the slow scan MEMS mirror. For instance, the rising edge of the triangle waveform may be for display scanning, and the falling edge may be for flying back. During the display scan, the slow scan MEMS mirror moves from a beginning position to an end position. By flying back, it is meant that the slow scan MEMS mirror returns to the beginning position (e.g., for another scan). The slow scan MEMS mirror repeats the display scanning and flying back at the frame rate. The frame rate depicted in FIG. 2 is approximately 120 hertz (Hz).

When the driving signal 202 is a triangle waveform as shown in FIG. 2, the frequency harmonics of the driving signal 202 may excite the resonant frequency components of the slow scan MEMS mirror and therefore distort the movements of the slow scan MEMS mirror. For instance, the response 204 is shown to have ripples at the first resonant frequency of the slow scan MEMS mirror. The first resonant frequency is approximately 500 Hz in the embodiment of FIG. 2 for non-limiting illustrative purposes. Accordingly, 500/120≈4 ripples are shown for each cycle of the driving signal 202. The ripples may negatively impact the display image quality. The closer the harmonics are to the frequency components of the slow scan MEMS mirror, the worse the impact is. To overcome such image quality impacts, an error compensator (e.g., a proportional-integral-derivative (PID) controller) or a notch filter is often used with fixed configurations optimized for the specific properties of the slow scan MEMS mirror. However, the properties of the slow scan MEMS mirror and its corresponding driving circuit may change with time and environment, and such changes are unpredictable. The fixed controller configurations will no longer be optimized for the changing parameters of the slow scan MEMS mirror. As a result, the performance of the slow scan MEMS mirror may drift away from optimum, and display image quality may deteriorate.

Example embodiments described herein are capable of automatically adjusting notch frequencies (f0, f1, f2 . . . ) of a notch filter to match with the varying parameters (e.g. resonant frequencies) of a slow scan MEMS mirror. For example, an adaptive feedback may be introduced to track shifts in resonant frequencies of the slow scan MEMS mirror in a relatively wide range and suppress oscillations caused by those resonant frequencies. In accordance with this example, the adaptive feedback may change the notch frequencies of the notch filter to track the resonant frequencies.

The discrete transfer function of an adaptive notch filter may be represented as follows:

$$H(z)=H1(z)+H2(z)+H3(z)+ \ldots \quad \text{(Equation 2)}$$

where H1(z) represents a first notch stage used to cancel a first resonance of the slow scan MEMS mirror, H2(z) represents a second notch stage used to cancel a second resonance, and so on.

Figure 3:
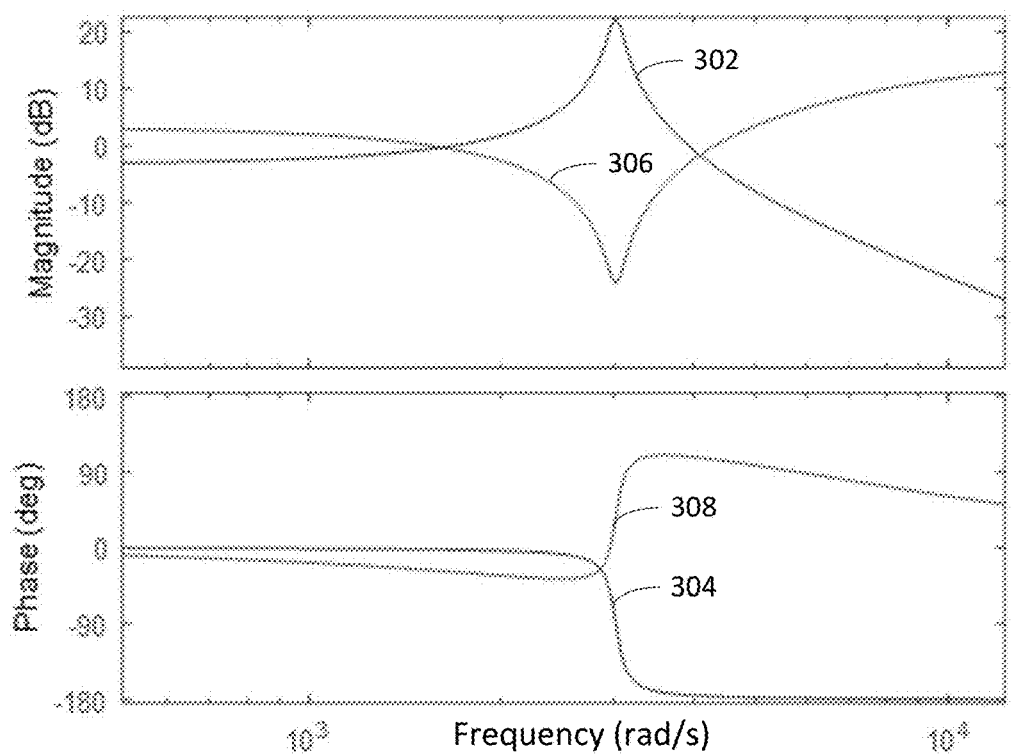
FIG. 3 shows an example frequency response (magnitude and phase) of a resonance of a slow scan MEMS mirror and an example frequency response (magnitude and phase) of a corresponding stage of an adaptive notch filter in accordance with an embodiment.

FIG. 3 shows an example frequency response (magnitude 302 and phase 304) of a resonance of a slow scan MEMS mirror and an example frequency response (magnitude 306 and phase 308) of a corresponding stage of an adaptive notch filter in accordance with an embodiment. As shown in FIG. 3, the magnitude 306 of the frequency response of the corresponding stage of the adaptive notch filter is matched to the magnitude 302 of the frequency response of the resonance of the slow scan MEMS mirror. The phase 308 of the frequency response of the corresponding stage of the adaptive notch filter is matched to the phase 304 of the frequency response of the resonance of the slow scan MEMS mirror. Each resonant frequency of the slow scan MEMS mirror may be cancelled with a respective corresponding notch stage (e.g., H1(z), H2(z), H3(z), . . . ) of the notch filter as depicted in FIG. 3. For example, by utilizing the techniques described herein, the adaptive notch frequency may be controlled such that the notch frequencies of the adaptive notch filter track the respective resonant frequencies of the slow scan MEMS mirror.

Figure 4:
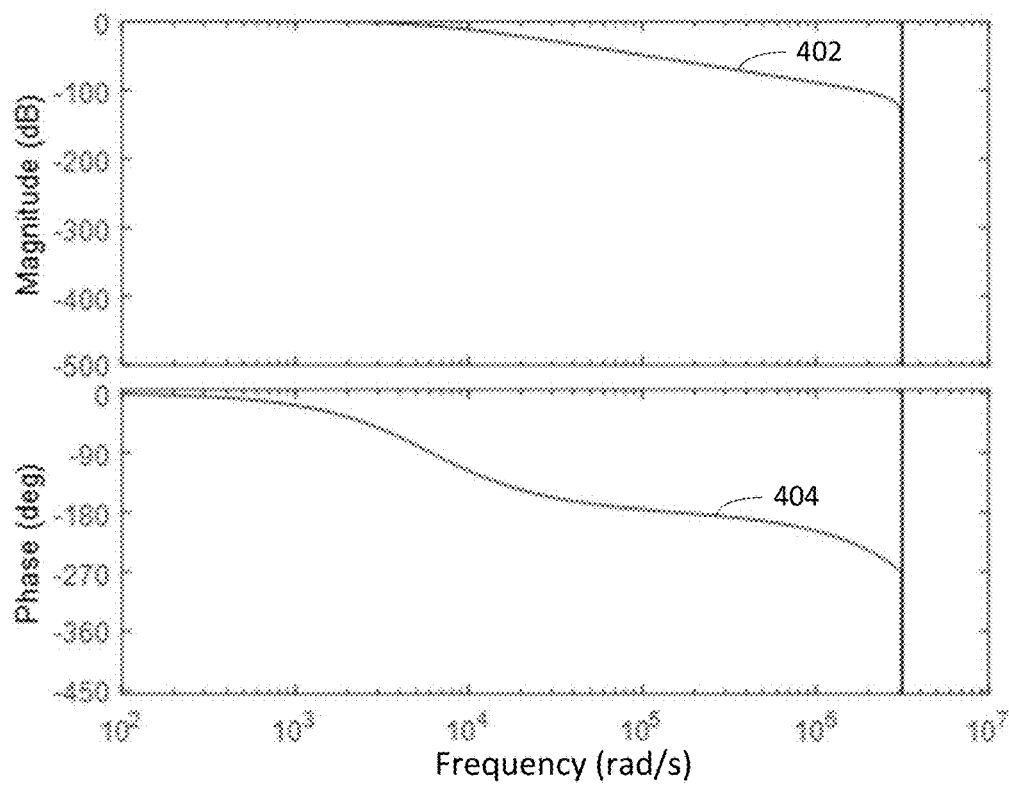
FIG. 4 shows an example frequency response (magnitude and phase) of a resonance of a combination of an adaptive notch filter and a slow scan MEMS mirror in accordance with an embodiment.

FIG. 4 shows an example frequency response (magnitude 402 and phase 404) of a combination of an adaptive notch filter and a slow scan MEMS mirror in accordance with an embodiment. By adjusting a notch frequency of the adaptive notch filter to track a resonant frequency of the slow scan MEMS mirror as described above with reference to FIG. 3, the magnitude 402 of the frequency response becomes substantially constant (e.g., flat) as depicted in FIG. 4, and no frequency components are excited in the frequency band shown in FIG. 4. The phase 404 of the frequency response is shown in FIG. 4 to change within a range of approximately 180 degrees (corresponding to a second-order oscillator) for non-limiting, illustrative purposes.

Figure 5:
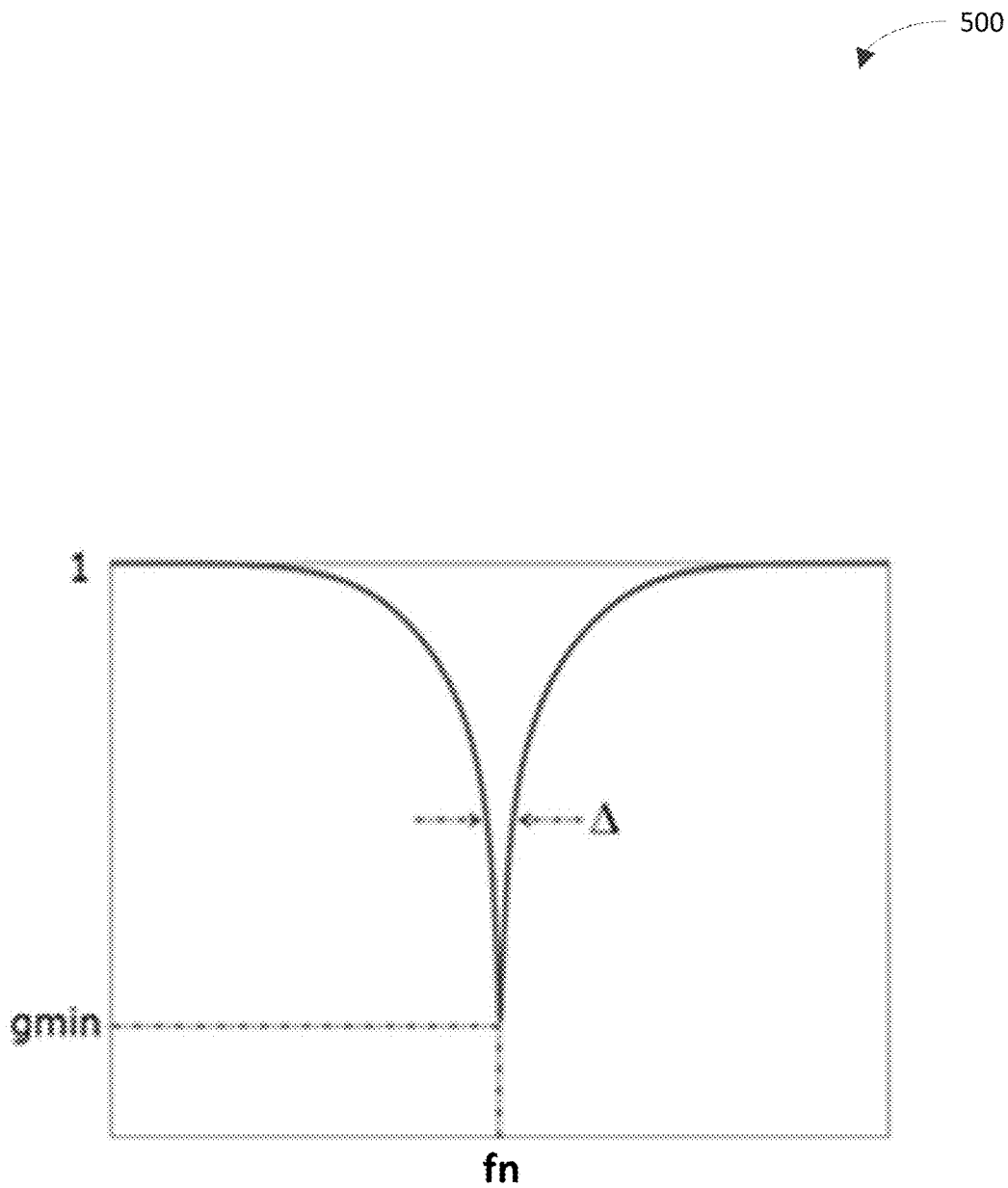
FIG. 5 shows a normalized magnitude of an example frequency response of an adaptive notch filter in accordance with an embodiment.

FIG. 5 shows a normalized magnitude 500 of an example frequency response of an adaptive notch filter in accordance with an embodiment. The normalized magnitude 500 illustrates example characteristics of the adaptive notch filter. These characteristics include a notch frequency, fn; a minimum gain, gmin; and a full-width half-maximum bandwidth, Δ. As shown in FIG. 5, the normalized magnitude 500 decreases exponentially from approximately one toward the minimum gain, gmin, as the frequency nears the notch frequency, fn, of the adaptive notch filter. The magnitude 500 equals the minimum gain, gmin, at the notch frequency, fn. The full-width half-maximum bandwidth, Δ, of the adaptive notch filter represents the bandwidth of the adaptive notch filter at a magnitude that is midway between one and the minimum gain, gmin.

Any one or more of the aforementioned characteristics of the adaptive notch filter may be adjusted to suppress resonance of a slow scan MEMS mirror that receives an input from the adaptive notch filter. For example, each stage of the adaptive notch filter may be characterized by a respective set of the aforementioned parameters (i.e., fn, gmin, and Δ). For each stage, fn may be close to or equal to a respective resonant frequency of the slow scan MEMS mirror; gmin may be close to or equal to the reciprocal of the peak height of the corresponding resonance of the slow scan MEMS mirror; and Δ may be close to or equal to a width of the peak of the resonance of the adaptive slow scan MEMS mirror. If the slow scan MEMS mirror operates in a stable environment, its resonance characteristics do not change, and therefore fn, gmin, and Δ need not be change. However, in actual practice, any one or more of the characteristics may vary with time, temperature, etc. Accordingly, an adaptive feedback may be connected from an output of the slow scan MEMS mirror to an input of the adaptive notch filter to automatically determine and adjust any one or more of the notch filter parameters fn, gmin, and Δ.

FIG. 6 is a block diagram of an example adaptive display control system 600 in accordance with an embodiment. Generally speaking, the adaptive display control system 100 operates to adjust a notch frequency of an adaptive notch filter 606 to track a resonant frequency of a slow scan MEMS mirror 608. For instance, adjusting the notch frequency to track the resonant frequency in this manner may cause a magnitude of a frequency response of a combination of the adaptive notch filter 606 and the slow scan MEMS mirror 608 to be substantially constant. For instance, the magnitude of the frequency response of the combination of the adaptive notch filter 606 and the slow scan MEMS mirror 608 may have a variation that is less than or equal to a threshold variation over a specified bandwidth. The threshold variation may be 6%, 5%, 4%, or other suitable value. The specified bandwidth may be a bandwidth over which the MEMS mirror 608 is configured to operate, though the scope of the example embodiments is not limited in this respect. As shown in FIG. 1, the adaptive display control system 100 includes a waveform generator 602, an adaptive feedback 604, the adaptive notch filter 606, and the slow scan MEMS mirror 608. It will be understood that the slow scan MEMS mirror 608 may include the slow scan MEMS mirror and its associated drivers and amplifiers.

The wave form generator 602 is configured to generate a target trajectory 610 of the slow scan MEMS mirror 608. The target trajectory 610 is a signal that represents a desired movement of the slow scan MEMS mirror 608. For example, the desired movement may include a scan movement and a flyback movement, which are repeated at a desired frame rate. The target trajectory 610 may represent the scan movement to be a linear movement from a beginning position to an end position. The target trajectory 610 may represent the flyback movement to be a linear movement from the end position back to the beginning position. Accordingly, the target trajectory 610 may represent the desired movement using a triangle waveform, though the scope of the example embodiments is mot limited in this respect.

The adaptive feedback 604 analyzes a frequency response of an actual trajectory 614 of the slow scan MEMS mirror 608 to determine one or more resonant frequencies of the slow scan MEMS mirror 608. For instance, the adaptive feedback 604 may compare a frequency response of the target trajectory 610 to the frequency response of the actual trajectory 614 to determine the one or more resonant frequencies. The actual trajectory 608 is a signal that represents an actual (e.g., measured) movement of the slow scan MEMS mirror 608. For example, the adaptive feedback 604 may include a motion sensor to detect the actual movement of the slow scan MEMS mirror 608. In accordance with his example, the adaptive feedback 604 may determine the actual trajectory 614 based on (e.g., based at least in part on) the detected actual movement. The adaptive feedback 604 determines a notch frequency adjustment 616 that is configured to compensate for oscillations of the slow scan MEMS mirror 608 that occur based on the resonant frequencies. The adaptive feedback 604 uses the notch frequency adjustment 616 to adjust the notch frequencies of the adaptive notch filter 606 that correspond to the resonant frequencies. By adjusting the notch frequencies, the adaptive feedback 604 causes the notch frequencies to track the resonant frequencies.

The adaptive notch filter 606 is configured to suppress the notch frequencies of the adaptive notch filter 606 (e.g., which have been adjusted by the adaptive feedback 604 to track the resonant frequencies of the slow scan MEMS mirror 608) in a frequency response of the slow scan MEMS mirror 608. For instance, the adaptive notch filter 606 may suppress the notch frequencies in the target trajectory 610 to generate a drive signal 612 (e.g., a periodic drive signal), which is configured to drive the slow scan MEMS mirror 608.

The adaptive feedback 604 and/or the adaptive notch filter 606 may be implemented in various ways to adjust a notch frequency of the adaptive notch filter 608 to track a resonant frequency of the slow scan MEMS mirror 608, including being implemented in hardware, software, firmware, or any combination thereof. For example, the adaptive feedback 604 and/or the adaptive notch filter 606 may be implemented as computer program code configured to be executed in one or more processors. In another example, the adaptive feedback 604 and/or the adaptive notch filter 606 may be implemented as hardware logic/electrical circuitry. For instance, the adaptive feedback 604 and/or the adaptive notch filter 606 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

In an example embodiment, the adaptive feedback 604 (or any portion thereof) and/or the adaptive notch filter 606 (or any portion thereof) includes one or more error compensators. An example of an error compensator is a proportional-integral-derivative (PID) controller.

The slow scan MEMS mirror 608 is configured to move (e.g., oscillate, resonate) in response to receipt of the drive signal 612. For instance, movement of the slow scan MEMS mirror 608 may be based at least in part on an amplitude, frequency, and/or phase of the drive signal 612. As mentioned above, the actual trajectory 614 represents the movement of the slow scan MEMS mirror 608. For example, the slow scan MEMS mirror 608 may generate the actual trajectory 614 to represent the movement of the slow scan MEMS mirror 608. In another example, a sensor (e.g., motion sensor) that is separate from the slow scan MEMS mirror 608 may be configured to generate the actual trajectory 614 in response to detecting the movement of the slow scan MEMS mirror 608. In both examples, the actual trajectory 614 is provided to the adaptive feedback 604 for comparison with the target trajectory 610.

The adaptive display control system 600 may operate to adjust any one or more notch frequencies of the adaptive notch filter 606 to track one or more respective resonant frequencies of the slow scan MEMS mirror 608 using any of a variety of adjustment techniques. A first example adjustment technique, which utilizes window functions, is described below with reference to FIGS. 8-13. A second example adjustment technique, which utilizes a fast Fourier transform, is described below with reference to FIGS. 14-16. A third example adjustment technique, which also utilizes a fast Fourier transform, is described below with reference to FIGS. 17-18. It should be noted that any of the example techniques described herein may be performed continuously without interrupting the normal operation of the corresponding slow scan MEMS mirror.

It will be recognized that the adaptive display control system 600 may not include all of the components shown in FIG. 6. Furthermore, the adaptive display control system 600 may include components in addition to or in lieu of those shown in FIG. 6. For example, the adaptive display control system 600 may further include a fast scan MEMS mirror. For instance, the slow scan MEMS mirror 608 and the fast scan MEMS mirror may operate collaboratively to reflect light for display of an image. In accordance with this example, the adaptive display control system 600 may further include a light source (e.g., a laser light source) that is configured to generate the light that is reflected by the slow scan MEMS mirror 608 and the fast scan MEMS mirror. It will be recognized that the fast scan MEMS mirror may scan at a relatively fast scan rate (e.g., in a range from 10 kilohertz (kHz) to 40 kHz), and the slow scan MEMS mirror 608 may scan at a relatively slow scan rate (e.g., in a range from 50 hertz (Hz) to 200 Hz).

Figure 7:
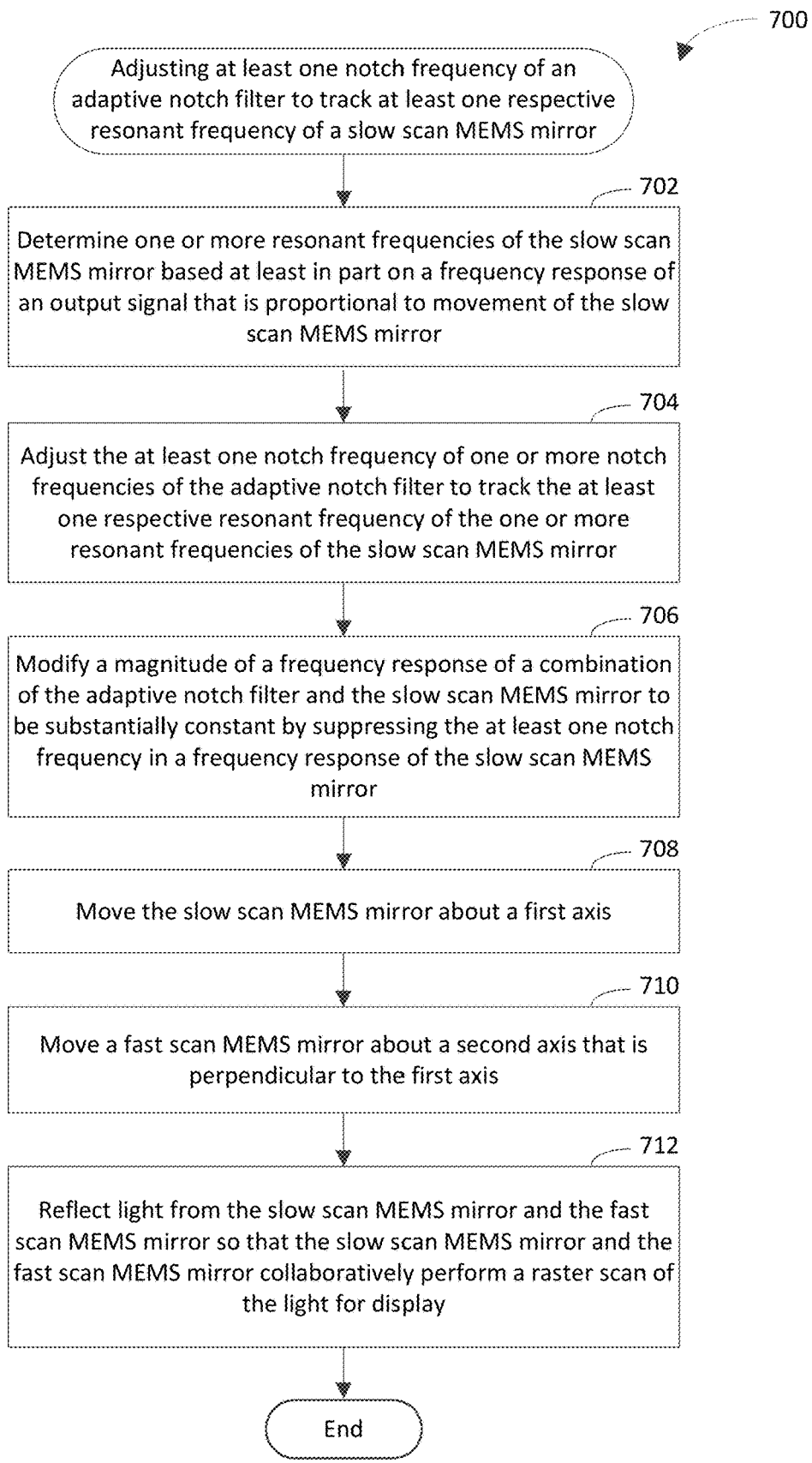

FIG. 7 depicts a flowchart of an example method for adjusting at least one notch frequency of an adaptive notch filter to track at least one respective resonant frequency of a slow scan MEMS mirror in accordance with an embodiment. Flowchart 700 may be performed by the adaptive display control system 600 shown in FIG. 6, for example. For illustrative purposes, flowchart 700 is described with respect to the adaptive display control system 600. Further structural and operational embodiments will be apparent to persons skilled in the relevant art(s) based on the discussion regarding flowchart 700.

As shown in FIG. 7, the method of flowchart 700 begins at step 702. In step 702, one or more resonant frequencies of the slow scan MEMS mirror are determined based at least in part on a frequency response of an output signal that is proportional to movement of the slow scan MEMS mirror. In an example implementation, the adaptive feedback 604 determines the one or more resonant frequencies of the slow scan MEMS mirror 680 based at least in part on a frequency response of the actual trajectory 614, which is proportional to the movement of the slow scan MEMS mirror 608.

At step 704, the at least one notch frequency of one or more notch frequencies of the adaptive notch filter is adjusted to track the at least one respective resonant frequency of the one or more resonant frequencies of the slow scan MEMS mirror. For instance, the at least one notch frequency may be adjusted to be the same as the at least one respective resonant frequency. In an example implementation, the adaptive feedback 604 adjusts the at least one notch frequency of one or more notch frequencies of the adaptive notch filter 606 to track the at least one respective resonant frequency of the one or more resonant frequencies of the slow scan MEMS mirror 608.

At step 706, a magnitude of a frequency response of a combination of the adaptive notch filter and the slow scan MEMS mirror is modified to be substantially constant by suppressing the at least one notch frequency in a frequency response of the slow scan MEMS mirror. In an example implementation, the adaptive notch filter 606 modifies the magnitude of the frequency response of the combination of the adaptive notch filter 606 and the slow scan MEMS mirror 608 to be substantially constant by suppressing the at least one notch frequency in the frequency response of the slow scan MEMS mirror 608.

At step 708, the slow scan MEMS mirror is moved about a first axis. In an example implementation, the slow scan MEMS mirror moves itself based at least in part on the drive signal 612.

At step 710, a fast scan MEMS mirror is moved about a second axis that is perpendicular to the first axis. In an example implementation, the fast scan MEMS mirror moves itself in response to another drive signal, which is different from the drive signal 612 that is configured to drive the slow scan MEMS mirror 608. For instance, the adaptive display control system 600 or another display control system may generate the other drive signal to drive (e.g., control) the fast scan MEMS mirror.

At step 712, light is reflected from the slow scan MEMS mirror and the fast scan MEMS mirror so that the slow scan MEMS mirror and the fast scan MEMS mirror collaboratively perform a raster scan of the light for display. In an example implementation, the slow scan MEMS mirror 608 and the fast scan MEMS mirror reflect the light so that the slow scan MEMS mirror 608 and the fast scan MEMS mirror collaboratively perform the raster scan of the light for display.

In some example embodiments, one or more steps 702, 704, 706, 708, 710, and/or 712 of flowchart 700 may not be performed. Moreover, steps in addition to or in lieu of steps 702, 704, 706, 708, 710, and/or 712 may be performed. For instance, in an example embodiment that utilizes window functions (hereinafter "the window functions embodiment"), the at least one notch frequency includes a first notch frequency.

Figure 8:
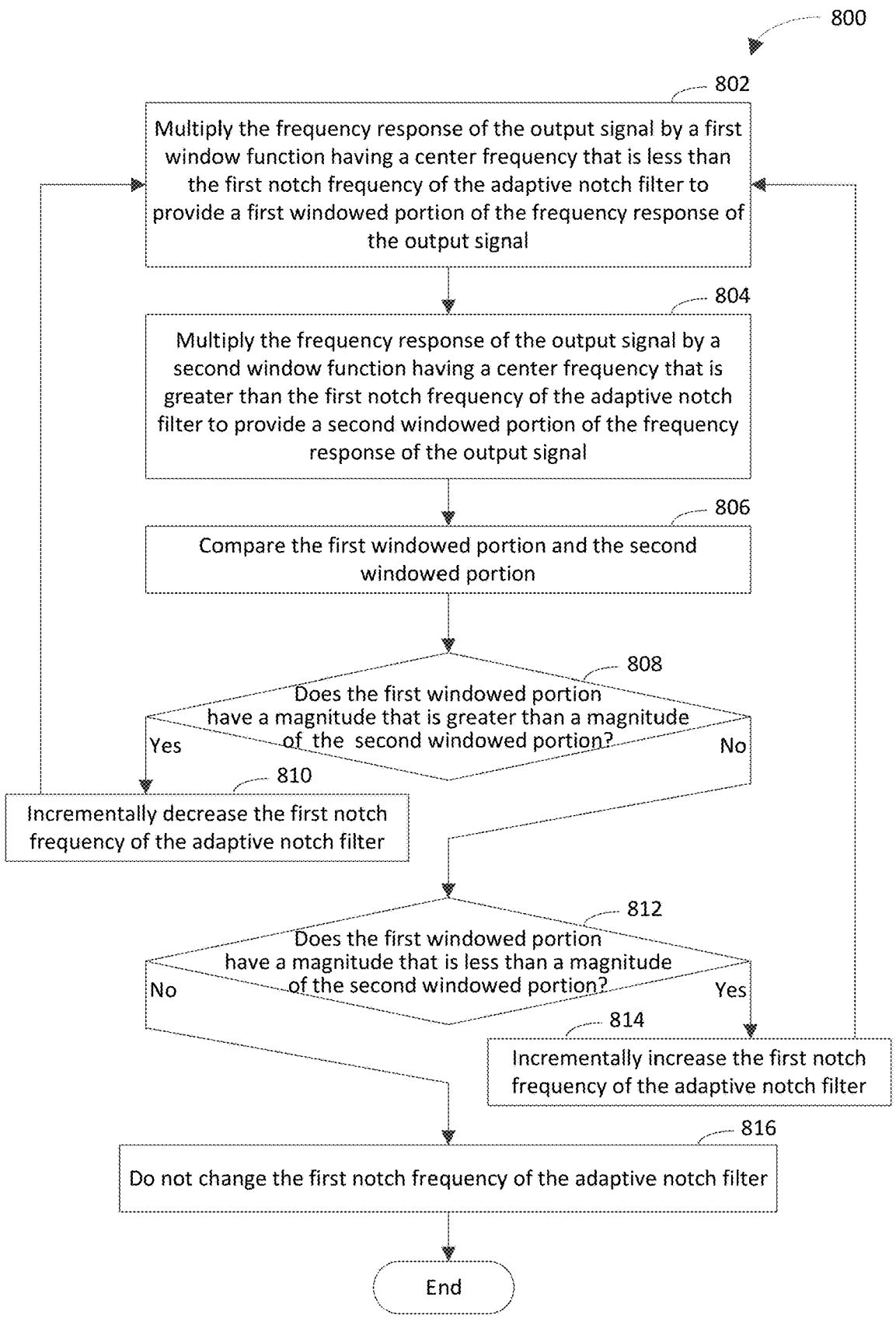

In a first aspect of the window functions embodiment, the method of flowchart 700 further includes one or more of the steps shown in flowchart 800 of FIG. 8 (e.g., to iteratively adjust the first notch frequency of the adaptive notch filter). Flowchart 800 may be performed by the adaptive feedback 604 shown in FIG. 6, for example. For illustrative purposes, flowchart 800 is described with respect to the adaptive feedback 900 shown in FIG. 9, which is an example implementation of the adaptive feedback 604. As shown in FIG. 9, the adaptive feedback 900 includes first window logic 902a, second window logic 902b, a first adder 904a, a second adder 904b, a combiner 906, and decision logic 908. Further structural and operational embodiments will be apparent to persons skilled in the relevant art(s) based on the discussion regarding flowchart 800.

As shown in FIG. 8, the method of flowchart 800 begins at step 802. In step 802, the frequency response of the output signal is multiplied by a first window function having a center frequency that is less than the first notch frequency of the adaptive notch filter to provide a first windowed portion of the frequency response of the output signal. In an example implementation, the first window logic 902a multiplies the frequency response of the actual trajectory 914 by the first window function having a center frequency that is less than the first notch frequency of the adaptive notch filter 606 to provide a first windowed portion 918a of the frequency response of the actual trajectory 914. The first adder 904a may sum or average iterative representations of the first windowed portion 918a corresponding to respective periods of time, though the scope of the example embodiments is not limited in this respect. Accordingly, the first windowed portion 918a may include the sum or average of the iterative representations upon being passed through the first adder 904a.

At step 804, the frequency response of the output signal is multiplied by a second window function having a center frequency that is greater than the first notch frequency of the adaptive notch filter to provide a second windowed portion of the frequency response of the output signal. A first shape of the first window function and a second shape of the second window function are the same. Each of the first shape and the second shape may be a bell-shape or a rectangle, through the scope of the example embodiments is not limited in this respect. It will be recognized that each of the first shape and the second shape may be any suitable shape. The first and second window functions are symmetrically oriented around the first notch frequency of the adaptive notch filter. In an example implementation, the second window logic 902b multiplies the frequency response of the actual trajectory 914 by the second window function having a center frequency that is greater than the first notch frequency of the adaptive notch filter 606 to provide a second windowed portion 918b of the frequency response of the actual trajectory 914. The second adder 904b may sum or average iterative representations of the second windowed portion 918b corresponding to respective periods of time, though the scope of the example embodiments is not limited in this respect. Accordingly, the second windowed portion 918b may include the sum or average of the iterative representations upon being passed through the second adder 904b.

At step 806, the first windowed portion and the second windowed portion are compared (e.g., to determine whether the first notch frequency of the adaptive notch filter is to be adjusted). For instance, the second windowed portion may be subtracted from the first windowed portion, or vice versa. The first windowed portion having a magnitude that is greater than a magnitude of the second windowed portion indicates that the first notch frequency of the adaptive notch filter is to be incrementally decreased. The first windowed portion having a magnitude that is less than a magnitude of the second windowed portion indicates that the first notch frequency of the adaptive notch filter is to be incrementally increased. In an example implementation, the combiner 906 compares the first windowed portion 918a and the second windowed portion 918b to generate a comparison indicator 920. For instance, the combiner 906 may subtract the magnitude of the second windowed portion 918b from the magnitude of the first windowed portion 918a, or vice versa, and generate the comparison indicator 920 to indicate whether the magnitude of the first windowed portion 918a is greater than or less than the second windowed portion 918b.

At step 808, a determination is made whether the first windowed portion has a magnitude that is greater than a magnitude of the second windowed portion. If the first windowed portion has a magnitude that is greater than a magnitude of the second windowed portion, flow continues to step 810. Otherwise, flow continues to step 812. In an example implementation, the decision logic 908 determines whether the first windowed portion 918a has a magnitude that is greater than a magnitude of the second windowed portion 918b. For instance, the decision logic 908 may make the determination based on the comparison indicator 920 (e.g., based on the comparison indicator 920 indicating that the first windowed portion 918a has a magnitude that is greater than a magnitude of the second windowed portion 918b).

At step 810, the first notch frequency of the adaptive notch filter is incrementally decreased. Upon completion of step 810, flow returns to step 802. In an example implementation, the decision logic 908 incrementally decreases the first notch frequency of the adaptive notch filter 606.

At step 812, a determination is made whether the first windowed portion has a magnitude that is less than a magnitude of the second windowed portion. If the first windowed portion has a magnitude that is less than a magnitude of the second windowed portion, flow continues to step 814. Otherwise, flow continues to step 816. In an example implementation, the decision logic 908 determines whether the first windowed portion 918a has a magnitude that is less than a magnitude of the second windowed portion 918b. For instance, the decision logic 908 may make the determination based on the comparison indicator 920 (e.g., based on the comparison indicator 920 indicating that the first windowed portion 918a has a magnitude that is less than a magnitude of the second windowed portion 918b).

At step 814, the first notch frequency of the adaptive notch filter is incrementally increased. Upon completion of step 814, flow returns to step 802. In an example implementation, the decision logic 908 incrementally increases the first notch frequency of the adaptive notch filter 606.

At step 816, the first notch frequency of the adaptive notch filter is not changed. Upon completion of step 816, flowchart 800 ends. In an example implementation, the decision logic 908 does not change the first notch frequency of the adaptive notch filter 606.

FIGS. 10-12 show example amplitude frequency responses 1000, 1100, and 1200 to illustrate some of the functionality described above with respect to flowchart 800 of FIG. 8 in accordance with embodiments. This function- ality will be described with continued reference to the adaptive display control system 600 of FIG. 6 for non-limiting, illustrative purposes. As shown in FIG. 10, a filter transfer function 1006 of the adaptive notch filter 606 is centered about the first notch frequency, f0, of the adaptive notch filter 606. A first window function 1002 and a second window function 1004 are symmetrically oriented around the first notch frequency, f0, of the adaptive notch filter 606. The first window function 1002 has a center frequency, $f_{c1}$, that is less than the first notch frequency, f0. The second window function 1004 has a center frequency, $f_{c2}$, that is greater than the first notch frequency, f0.

The mirror resonance 1008 represents the frequency response of the output signal (e.g., the actual trajectory 614 depicted in FIG. 6). The mirror resonance 1008 is shown to be completely overlapped by the first window function 1002 and partially overlapped by the second window function 1004 for non-limiting, illustrative purposes. It will be recognized that the each of the first and second window functions 1002 and 1004 may partially overlap the mirror resonance 1008, fully overlap the mirror resonance 1008, or not overlap the mirror resonance 1008 at all. The mirror resonance 1008 may be multiplied by the first window function 1002 and the second window function 1004, as described above with reference to steps 802 and 804 of flowchart 800, to generate the first windowed portion and the second windowed portion that are compared at step 806.

The first window function 1002 and the second window function 1004 are shown to be bell-curves in FIG. 10 for non-limiting, illustrative purposes. It will be recognized that each of the first and second window functions 1002 and 1004 may have any suitable shape. For instance, FIG. 11 shows a first window function 1102 and a second window function 1104 that have a rectangular shape for non-limiting, illustrative purposes.

By performing the steps of flowchart 800, the center frequency, f0, of the adaptive notch filter 606 shown in FIG. 11 may be adjusted to f0', as depicted in FIG. 12. By adjusting the center frequency, f0, in this manner, the filter transfer function 1006 becomes centered about the updated first notch frequency, f0', of the adaptive notch filter 606, resulting in an updated filter transfer function 1206. The first window function 1102 and the second window function 1104 are shifted so that they are symmetrically oriented around the updated first notch frequency, f0'. The first window function 1002 has an updated center frequency, $f_{c1}'$, that is less than the updated first notch frequency, f0'. The second window function 1004 has an updated center frequency, $f_{c2}'$, that is greater than the updated first notch frequency, f0'. The mirror resonance 1008 is now centered about the updated first notch frequency, f0', of the adaptive notch filter 606 as a result of the first notch frequency, f0, being updated to the updated first notch frequency, f0', to track the mirror resonance 1008. The combined system response 1210 (e.g., the frequency response of a combination of the adaptive notch filter 606 and the slow scan MEMS mirror 608) is centered about the updated first notch frequency, f0', of the adaptive notch filter 606. The magnitude of the combined system response 1210 is substantially constant as a result of the first notch frequency, f0, of the adaptive notch filter 606 being updated to the updated first notch frequency, f0', to track the mirror resonance 1008.

In a second aspect the window functions embodiment, the first notch frequency of the adaptive notch filter is tuned to match a first resonant frequency of the slow scan MEMS mirror. In accordance with the second aspect, the method of flowchart 800 further includes one or more of the steps shown in flowchart 1300 of FIG. 13 (e.g., to iteratively adjust an amount of suppression of the first notch frequency by the adaptive notch filter). For illustrative purposes, flowchart 1300 is described with respect to the adaptive feedback 900 shown in FIG. 9. Further structural and operational embodiments will be apparent to persons skilled in the relevant art(s) based on the discussion regarding flowchart 1300.

Figure 13:
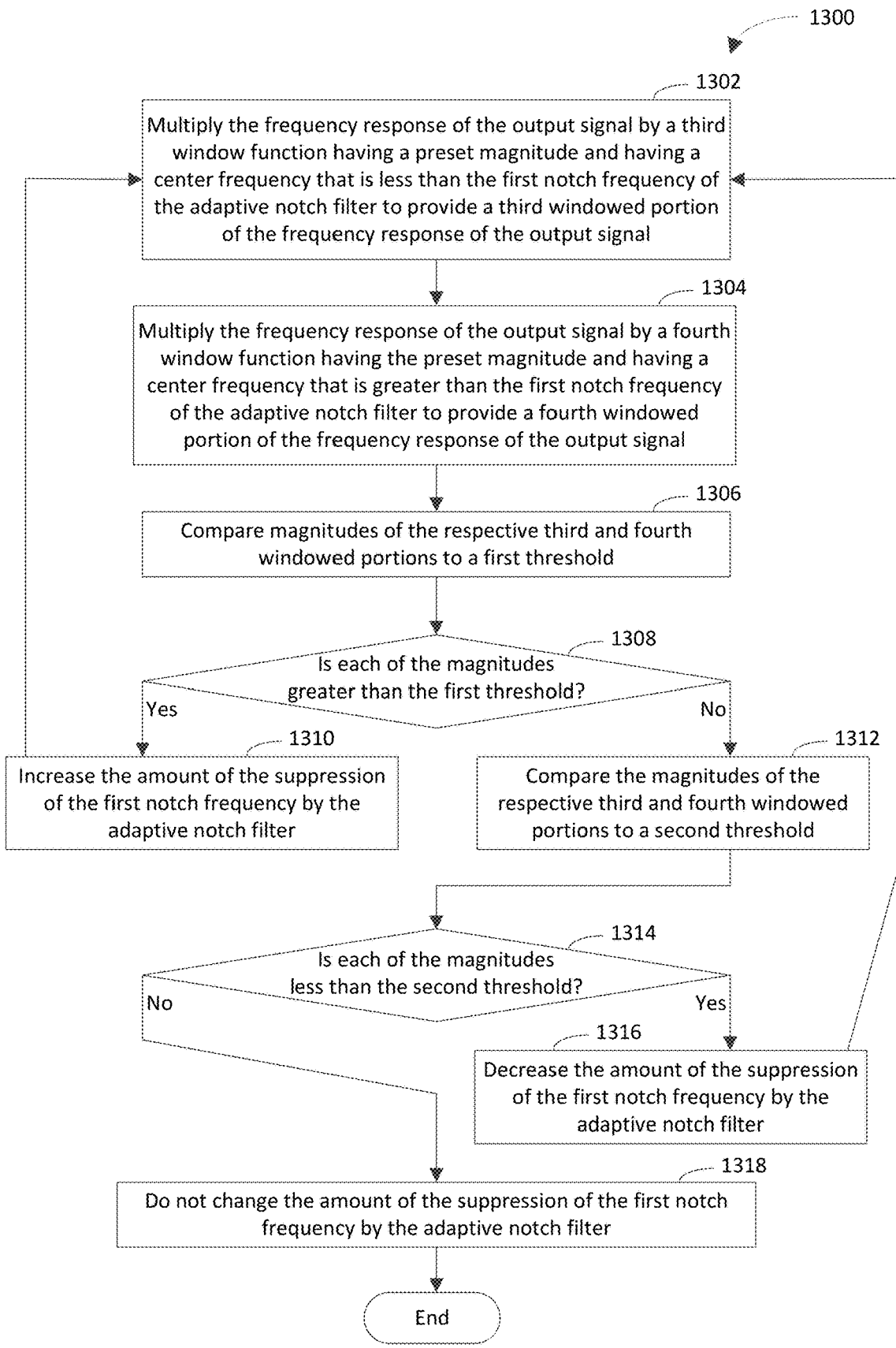

As shown in FIG. 13, the method of flowchart 1300 begins at step 1302. In step 1302, the frequency response of the output signal is multiplied by a third window function having a preset magnitude and having a center frequency that is less than the first notch frequency of the adaptive notch filter to provide a third windowed portion of the frequency response of the output signal. In an example implementation, the first window logic 902a multiplies the frequency response of the actual trajectory 914 by the third window function having the present magnitude and having a center frequency that is less than the first notch frequency of the adaptive notch filter 606 to provide a third windowed portion of the frequency response of the actual trajectory 914. The first window function and the third window function may be the same or different. Accordingly, the first windowed portion 918a and the third windowed portion may be the same or different. The first adder 904a may sum or average iterative representations of the third windowed portion corresponding to respective periods of time, though the scope of the example embodiments is not limited in this respect. Accordingly, the third windowed portion may include the sum or average of the iterative representations upon being passed through the first adder 904a.

At step 1304, the frequency response of the output signal is multiplied by a fourth window function having the preset magnitude and having a center frequency that is greater than the first notch frequency of the adaptive notch filter to provide a fourth windowed portion of the frequency response of the output signal. In an example implementation, the second window logic 902b multiplies the frequency response of the actual trajectory 914 by the fourth window function having the preset magnitude and having a center frequency that is greater than the first notch frequency of the adaptive notch filter 606 to provide a fourth windowed portion of the frequency response of the actual trajectory 914. The second window function and the fourth window function may be the same or different. Accordingly, the second windowed portion 918b and the fourth windowed portion may be the same or different. The second adder 904b may sum or average iterative representations of the fourth windowed portion corresponding to respective periods of time, though the scope of the example embodiments is not limited in this respect. Accordingly, the fourth windowed portion may include the sum or average of the iterative representations upon being passed through the second adder 904b.

At step 1306, magnitudes of the respective third and fourth windowed portions are compared to a first threshold. In an example implementation, the decision logic 908 compares the magnitudes of the respective third and fourth windowed portions to the first threshold.

At step 1308, a determination is made whether each of the magnitudes of the third and fourth windowed portions is greater than a first threshold. If each of the magnitudes of the third and fourth windowed portions is greater than the first threshold, flow continues to step 1310. Otherwise, flow continues to step 1312. In an example implementation, the decision logic 908 determines whether each of the magnitudes of the third and fourth windowed portions is greater than the first threshold.

At step 1310, the amount of the suppression of the first notch frequency by the adaptive notch filter is increased. Upon completion of step 1310, flow returns to step 1302. In an example implementation, the decision logic 908 increases the amount of the suppression of the first notch frequency by the adaptive notch filter 606.

At step 1312, the magnitudes of the respective third and fourth windowed portions are compared to a second threshold. In an example implementation, the decision logic 908 compares the magnitudes of the respective third and fourth windowed portions to the second threshold.

At step 1314, a determination is made whether each of the magnitudes of the third and fourth windowed portions is less than a second threshold. If each of the magnitudes of the third and fourth windowed portions is less than the second threshold, flow continues to step 1316. Otherwise, flow continues to step 1318. In an example implementation, the decision logic 908 determines whether each of the magnitudes of the third and fourth windowed portions is less than the second threshold.

At step 1316, the amount of the suppression of the first notch frequency by the adaptive notch filter is decreased. Upon completion of step 1316, flow returns to step 1302. In an example implementation, the decision logic 908 decreases the amount of the suppression of the first notch frequency by the adaptive notch filter 606.

At step 1318, the amount of the suppression of the first notch frequency by the adaptive notch filter is not changed. Upon completion of step 1318, flowchart 1300 ends. In an example implementation, the decision logic 908 does not change the amount of the suppression of the first notch frequency by the adaptive notch filter 606.

The window functions embodiment described above may enable adjustment of the notch frequencies of the adaptive notch filter to track the resonant frequencies of the slow scan MEMS mirror in a relatively efficient, quick, and power-saving manner.

It will be recognized that the adaptive feedback 900 may not include all of the components shown in FIG. 9. Furthermore, the adaptive feedback 900 may include components in addition to or in lieu of those shown in FIG. 9.

In another example embodiment, determining the one or more resonant frequencies of the slow scan MEMS mirror at step 702 includes determining the one or more resonant frequencies of the slow scan MEMS mirror based at least in part on a comparison of (e.g., a difference between) a frequency response of a target trajectory that is configured to drive the slow scan MEMS mirror and the frequency response of the output signal that is proportional to the movement of the slow scan MEMS mirror in response to the target trajectory. The target trajectory may be a triangle waveform, though the scope of the example embodiments is not limited in this respect. It will be recognized that the target trajectory may be any suitable type of waveform and may be symmetric or asymmetric.

In a first aspect of this embodiment that utilizes a fast Fourier transform (hereinafter "the first FFT aspect"), the method of flowchart 700 further includes one or more of the steps shown in flowchart 1400 of FIG. 14. For illustrative purposes, flowchart 1400 is described with respect to the adaptive display control system 600 shown in FIG. 6. Further structural and operational embodiments will be apparent to persons skilled in the relevant art(s) based on the discussion regarding flowchart 1400.

Figure 14:
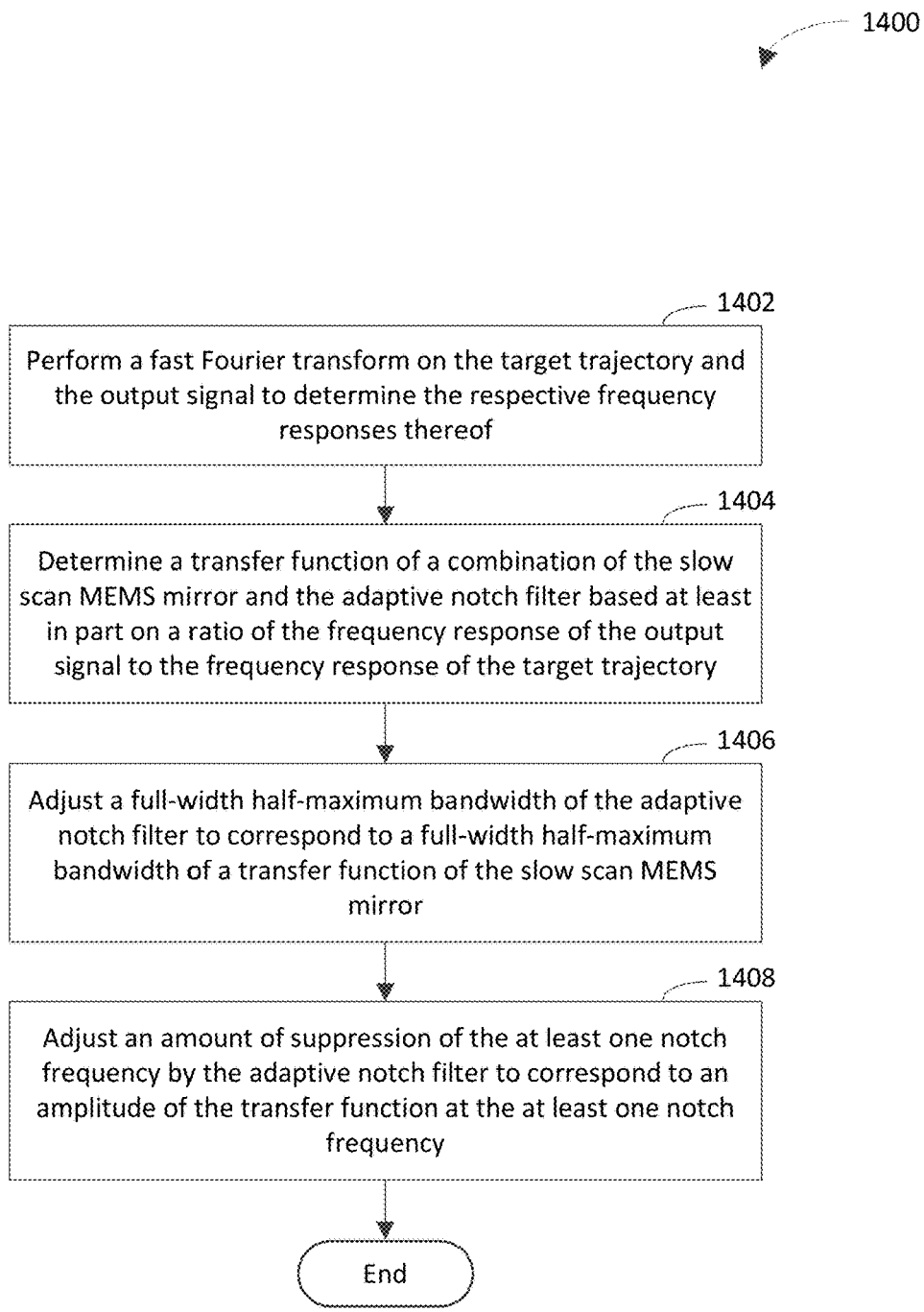

As shown in FIG. 14, the method of flowchart 1400 begins at step 1402. In step 1402, a fast Fourier transform is performed on the target trajectory and the output signal to determine the respective frequency responses thereof. In an example implementation, the adaptive feedback 604 performs the fast Fourier transform on the target trajectory 610 and the actual trajectory 614 to determine the respective frequency responses thereof.

At step 1404, a transfer function of a combination of the slow scan MEMS mirror and the adaptive notch filter is determined based at least in part on a ratio of the frequency response of the output signal to the frequency response of the target trajectory. For example, the transfer function may be a normalized transfer function. In another example, the ratio of the frequency response of the output signal to the frequency response of the target trajectory may be the frequency response of the output signal divided by the frequency response of the target trajectory. In an example implementation, the adaptive feedback 604 determines a transfer function of a combination of the slow scan MEMS 608 and the adaptive notch filter 606 based at least in part on a ratio of the frequency response of the actual trajectory 614 to the frequency response of the target trajectory 610.

At step 1406, a full-width half-maximum bandwidth of the adaptive notch filter is adjusted to correspond to (e.g., equal) a full-width half-maximum bandwidth of a transfer function of the slow scan MEMS mirror. For instance, the transfer function of the slow scan MEMS mirror may be derived from the transfer function of the combination of the slow scan MEMS mirror and the adaptive notch filter. In an example implementation, the adaptive feedback 604 adjusts a full-width half-maximum bandwidth of the adaptive notch filter 606 to correspond to a full-width half-maximum bandwidth of a transfer function of the slow scan MEMS mirror 608.

At step 1408, an amount of suppression of the at least one notch frequency by the adaptive notch filter is adjusted to correspond to (e.g., equal) an amplitude of the transfer function at the at least one notch frequency. In an example implementation, the adaptive feedback 604 adjusts an amount of suppression of the at least one notch frequency by the adaptive notch filter 606 to correspond to an amplitude of the transfer function at the at least one notch frequency.

Further to the discussion above regarding flowchart 1400 of FIG. 14, FIG. 15 shows an example magnitude frequency response around a resonance of the slow scan MEMS mirror 608 for an initial setting of the adaptive notch filter 606 shown in FIG. 6 in accordance with an embodiment. Plot 1502 represents the frequency response of the output signal (e.g., actual trajectory 614) of the slow scan MEMS mirror 608. Plot 1504 represents the frequency response of the target trajectory 610. Plot 1506 represents the frequency response of the initial setting of the adaptive notch filter 606. It should be noted that these analyses and the corresponding automatic filter parameter adjustments may be performed continuously without interrupting the normal operation of the slow scan MEMS mirror 608.

FIG. 16 illustrates an example transfer function 1600 of a combination of the adaptive notch filter 606 and the slow scan MEMS mirror 608 shown in FIG. 6 around a resonance of the slow scan MEMS mirror 608 in accordance with an embodiment. For instance, the transfer function 1600 may be determined by calculating a ratio of the frequency response of the output signal 1502 shown in FIG. 15 to the frequency response of the target trajectory 1504 shown in FIG. 15. Once the transfer function 1600 has been determined, the notch filter parameters fn, gmin, and Δ of the notch filter 606 may be derived. For instance, analysis of the transfer function 1600 shown in FIG. 16 may provide gmin=0.045=1/22 and fn=480 Hz. With Δ, gmin and fn, the transfer function of the corresponding notch stage of the adaptive notch filter 606 may be implemented.

In a second aspect of this embodiment that utilizes a fast Fourier transform (hereinafter "the second FFT aspect"), the at least one notch frequency includes a first notch frequency corresponding to a first resonant frequency of the slow scan MEMS mirror. In accordance with the second FFT aspect, the method of flowchart 700 further includes one or more of the steps shown in flowchart 1700 of FIG. 17. Flowchart 1700 may be performed by the adaptive feedback 604 and the adaptive notch filter 606 shown in FIG. 6, for example. For illustrative purposes, flowchart 1700 is described with respect to the adaptive control logic 1800 shown in FIG. 18, which is an example implementation of the combination of the adaptive feedback 604 and the adaptive notch filter 606. As shown in FIG. 18, the adaptive control logic 1800 includes first fast Fourier transform (FFT) logic 1820, a first error compensator 1822, inverse fast Fourier transform (IFFT) logic 1840, second FFT logic 1830, and a second error compensator 1832. The first and second error compensators 1822 and 1832 may be implemented as respective proportional-integral-derivative (PID) controllers, though the scope of the example embodiments is not limited in this respect. Further structural and operational embodiments will be apparent to persons skilled in the relevant art(s) based on the discussion regarding flowchart 1700.

Figure 17:
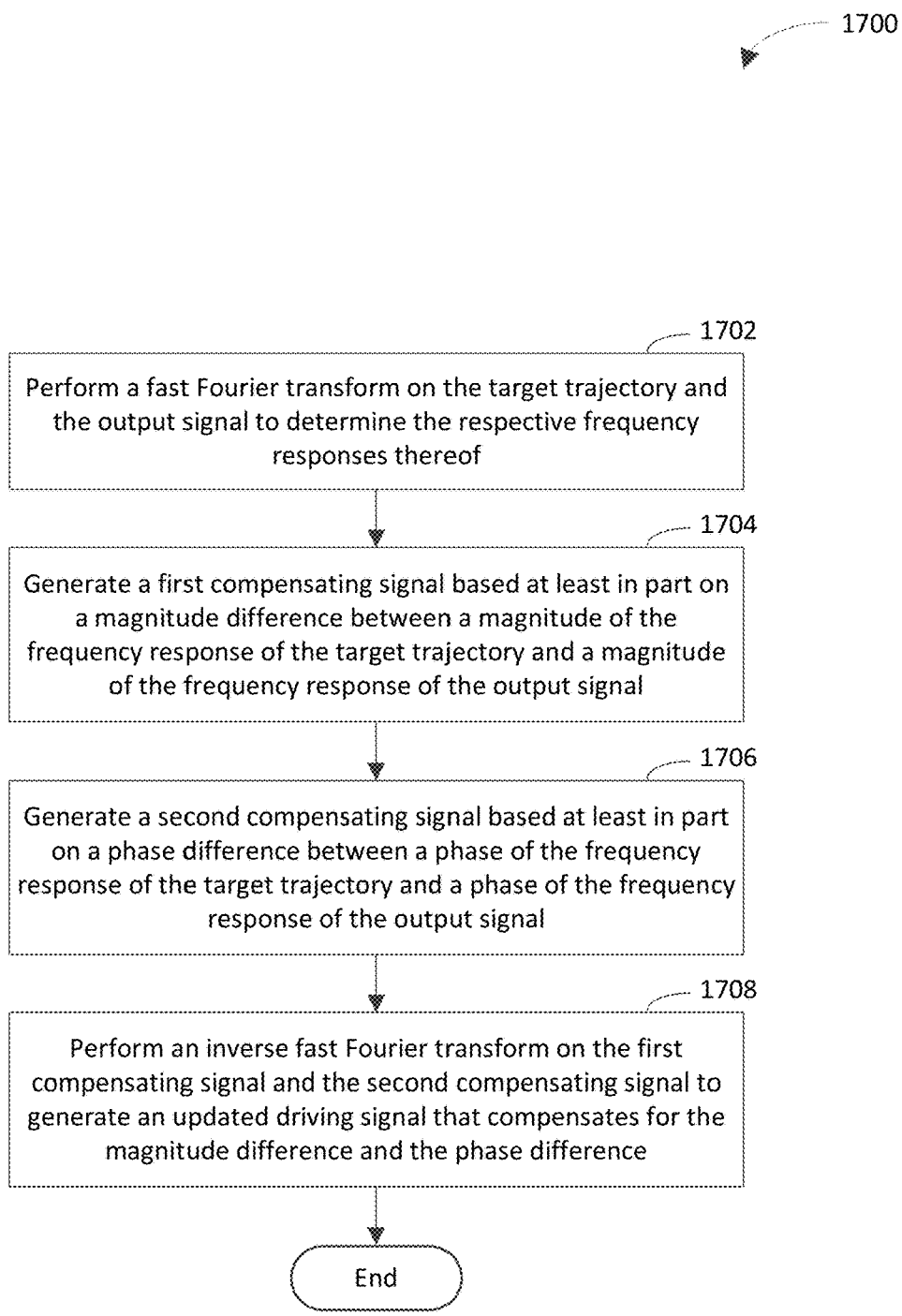

As shown in FIG. 17, the method of flowchart 1700 begins at step 1702. In step 1702, a fast Fourier transform is performed on the target trajectory and the output signal to determine the respective frequency responses thereof. In an example implementation, the first FFT logic 1820 performs a fast Fourier transform on the actual trajectory 1814 to determine the frequency response (first magnitude 1824 and first phase 1826) thereof. In accordance with this implementation, the second FFT logic 1830 performs a fast Fourier transform on the target trajectory 1810 to determine the frequency response (second magnitude 1834 and second phase 1836) thereof.

At step 1704, a first compensating signal is generated based at least in part on a magnitude difference between a magnitude of the frequency response of the target trajectory and a magnitude of the frequency response of the output signal. In an example implementation, the first error compensator 1822 generates a first compensating signal 1828 based at least in part on a magnitude difference between the second magnitude 1834 of the frequency response of the target trajectory 1810 and the first magnitude 1824 of the frequency response of the actual trajectory 1814.

At step 1706, a second compensating signal is generated based at least in part on a phase difference between a phase of the frequency response of the target trajectory and a phase of the frequency response of the output signal. In an example implementation, the second error compensator 1832 generates a second compensating signal 1838 based at least in part on a phase difference between the second phase 1836 of the frequency response of the target trajectory 1810 and the first phase 1826 of the frequency response of the actual trajectory 1814.

At step 1708, an inverse fast Fourier transform is performed on the first compensating signal and the second compensating signal to generate an updated driving signal that compensates for the magnitude difference and the phase difference. In an example implementation, the IFFT logic 1840 performs the inverse fast Fourier transform on the first compensating signal 1828 and the second compensating signal 1838 to generate an updated driving signal 1812 that compensates for the magnitude difference and the phase difference.

In an example of the second FFT aspect, generating the first compensating signal at step 1704 includes using a first PID controller to generate the first compensating signal based at least in part on the magnitude difference between the magnitude of the frequency response of the target trajectory and the magnitude of the frequency response of the output signal. In accordance with this example, generating the second compensating signal at step 1706 includes using a second PID controller to generate the second compensating signal based at least in part on the phase difference between the phase of the frequency response of the target trajectory and the phase of the frequency response of the output signal. For example, a frequency response of the updated driving signal may have a magnitude and a phase that compensate for the magnitude difference and the phase difference, respectively. In another example, the updated driving signal may compensate for non-linear frequency component(s) in the frequency response of the output signal that result from the magnitude difference and/or the phase difference. In accordance with this example, the adaptive notch filter may remove the non-linear frequency component(s) from the frequency response of the output signal.

The first and second FFT aspects of the embodiment described above may enable adjustment of the notch frequencies of the adaptive notch filter to track the resonant frequencies of the slow scan MEMS mirror with a relatively high accuracy and precision.

It will be recognized that the adaptive control logic 1800 may not include all of the components shown in FIG. 18. Furthermore, the adaptive control logic 1800 may include components in addition to or in lieu of those shown in FIG. 18.

A notch filter may be adaptively tuned in accordance with any one or more of the techniques described herein, which may ensure optimal performance of a slow scan MEMS mirror to which the notch filter provides a driving signal. FIG. 19 is a graph 1900 showing an example plot 1902 of a target trajectory of a slow scan MEMS mirror in accordance with an embodiment. FIG. 20 is a graph 2000 showing an example plot 2002 of an actual trajectory of a slow scan MEMS mirror, which results from utilizing one or more of the example techniques described herein, in accordance with an embodiment. It can be seen that the ripples are automatically suppressed in the plot 2002 of the actual trajectory.

Any one or more of the waveform generator 602, adaptive feedback 604, adaptive notch filter 606, adaptive feedback 900, first window logic 902*a*, second window logic 902*b*, first adder 904*a*, second adder 904*b*, combiner 906, decision logic 908, adaptive control logic 1800, first FFT logic 1820, first error compensator 1822, second FFT logic 1830, second error compensator 1832, IFFT logic 1840, flowchart 700, flowchart 800, flowchart 1300, flowchart 1400, and/or flowchart 1700 may be implemented in hardware, software, firmware, or any combination thereof.

For example, any one or more of the waveform generator 602, adaptive feedback 604, adaptive notch filter 606, adaptive feedback 900, first window logic 902*a*, second window logic 902*b*, first adder 904*a*, second adder 904*b*, combiner 906, decision logic 908, adaptive control logic 1800, first FFT logic 1820, first error compensator 1822, second FFT logic 1830, second error compensator 1832, IFFT logic 1840, flowchart 700, flowchart 800, flowchart 1300, flowchart 1400, and/or flowchart 1700 may be implemented, at least in part, as computer program code configured to be executed in one or more processors.

In another example, any one or more of the waveform generator 602, adaptive feedback 604, adaptive notch filter 606, adaptive feedback 900, first window logic 902*a*, second window logic 902*b*, first adder 904*a*, second adder 904*b*, combiner 906, decision logic 908, adaptive control logic 1800, first FFT logic 1820, first error compensator 1822, second FFT logic 1830, second error compensator 1832, IFFT logic 1840, flowchart 700, flowchart 800, flowchart 1300, flowchart 1400, and/or flowchart 1700 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example adaptive display control system comprises a slow scan microelectromechanical systems (MEMS) mirror, adaptive feedback, and an adaptive notch filter. The slow scan MEMS mirror is configured to move about an axis. The adaptive feedback is configured to determine one or more resonant frequencies of the slow scan MEMS mirror based at least in part on a frequency response of an output signal that is proportional to movement of the slow scan MEMS mirror. The adaptive feedback is further configured to adjust at least one notch frequency of one or more notch frequencies of an adaptive notch filter to track at least one respective resonant frequency of the one or more resonant frequencies of the slow scan MEMS mirror. The adaptive notch filter is configured to modify a magnitude of a frequency response of a combination of the adaptive notch filter and the slow scan MEMS mirror to be substantially constant by suppressing the at least one notch frequency in a frequency response of the slow scan MEMS mirror.

In a first aspect of the example adaptive display control system, the example adaptive display control system further comprises a FS MEMS mirror configured to move about an axis that is perpendicular to the axis about which the slow scan MEMS mirror is configured to move. In accordance with the first aspect, the slow scan MEMS mirror and a fast scan MEMS mirror are configured to collaboratively perform a raster scan of light for display.

In a second aspect of the example adaptive display control system, the at least one notch frequency includes a first notch frequency. In accordance with the second aspect, the adaptive feedback is configured to multiply the frequency response of the output signal by a first window function having a center frequency that is less than the first notch frequency of the adaptive notch filter to provide a first windowed portion of the frequency response of the output signal. In further accordance with the second aspect, the adaptive feedback is configured to multiply the frequency response of the output signal by a second window function having a center frequency that is greater than the first notch frequency of the adaptive notch filter to provide a second windowed portion of the frequency response of the output signal. In further accordance with the second aspect, a first shape of the first window function and a second shape of the second window function are same. In further accordance with the second aspect, the first and second window functions are symmetrically oriented around the first notch frequency of the adaptive notch filter. In further accordance with the second aspect, the adaptive feedback is configured to compare the first windowed portion and the second windowed portion to determine whether the first notch frequency of the adaptive notch filter is to be adjusted. The first windowed portion having a magnitude that is greater than a magnitude of the second windowed portion indicates that the first notch frequency of the adaptive notch filter is to be incrementally decreased. The first windowed portion having a magnitude that is less than a magnitude of the second windowed portion indicates that the first notch frequency of the adaptive notch filter is to be incrementally increased. The second aspect of the example adaptive display control system may be implemented in combination with the first aspect of the example adaptive display control system, though the example embodiments are not limited in this respect.

In an example of the second aspect, the first notch frequency of the adaptive notch filter is tuned to match a first resonant frequency of the slow scan MEMS mirror. In accordance with this example, the adaptive feedback is configured to multiply the frequency response of the output signal by a third window function having a preset magnitude and having a center frequency that is less than the first notch frequency of the adaptive notch filter to provide a third windowed portion of the frequency response of the output signal. In further accordance with this example, the adaptive feedback is configured to multiply the frequency response of the output signal by a fourth window function having the preset magnitude and having a center frequency that is greater than the first notch frequency of the adaptive notch filter to provide a fourth windowed portion of the frequency response of the output signal. In further accordance with this example, the adaptive feedback is configured to determine whether to adjust an amount of suppression of the first notch frequency by the adaptive notch filter based at least in part on magnitudes of the respective third and fourth windowed portions. Each of the magnitudes being greater than a first threshold that is based at least in part on an initial amount of suppression of the first notch frequency by the adaptive notch filter indicates that the amount of the suppression of the first notch frequency by the adaptive notch filter is to be increased. Each of the magnitudes being less than a second threshold that is based at least in part on the initial amount of suppression of the first notch frequency by the adaptive notch filter indicates that the amount of the suppression of the first notch frequency by the adaptive notch filter is to be decreased.

In a third aspect of the example adaptive display control system, the adaptive feedback is configured to determine the one or more resonant frequencies of the slow scan MEMS mirror based at least in part on a comparison of a frequency response of a target trajectory that is configured to drive the slow scan MEMS mirror and the frequency response of the output signal that is proportional to the movement of the slow scan MEMS mirror in response to the target trajectory. The third aspect of the example adaptive display control system may be implemented in combination with the first and/or second aspect of the example adaptive display control system, though the example embodiments are not limited in this respect.

In a first example of the third aspect, the adaptive feedback is configured to perform a fast Fourier transform on the target trajectory and the output signal to determine the respective frequency responses thereof. In accordance with this example, the adaptive feedback is configured to determine a transfer function of a combination of the slow scan MEMS mirror and the adaptive notch filter based at least in part on a ratio of the frequency response of the output signal to the frequency response of the target trajectory.

In a first implementation of the first example of the third aspect, the adaptive feedback is further configured to adjust a full-width half-maximum bandwidth of the adaptive notch filter to correspond to a full-width half-maximum bandwidth of a transfer function of the slow scan MEMS mirror.

In a second implementation of the first example of the third aspect, the adaptive feedback is further configured to adjust an amount of suppression of the at least one notch frequency by the adaptive notch filter to correspond to an amplitude of the transfer function at the at least one notch frequency.

In a second example of the third aspect, the at least one notch frequency includes a first notch frequency corresponding to a first resonant frequency of the slow scan MEMS mirror. In accordance with this example, the adaptive feedback is configured to perform a fast Fourier transform on the target trajectory and the output signal to determine the respective frequency responses thereof. In further accordance with this example, the adaptive feedback is configured to generate a first compensating signal based at least in part on a magnitude difference between a magnitude of the frequency response of the target trajectory and a magnitude of the frequency response of the output signal. In further accordance with this example, the adaptive feedback is configured to generate a second compensating signal based at least in part on a phase difference between a phase of the frequency response of the target trajectory and a phase of the frequency response of the output signal. In further accordance with this example, the adaptive notch filter is configured to perform an inverse fast Fourier transform on the first compensating signal and the second compensating signal to generate an updated driving signal that compensates for the magnitude difference and the phase difference.

In an implementation of the second example of the third aspect, the adaptive feedback comprises a first proportional-integral-derivative controller and a second proportional-integral-derivative controller. The first proportional-integral-derivative controller is configured to generate the first compensating signal based at least in part on the magnitude difference between the magnitude of the frequency response of the target trajectory and the magnitude of the frequency response of the output signal. The second proportional-integral-derivative controller is configured to generate the second compensating signal based at least in part on the phase difference between the phase of the frequency response of the target trajectory and the phase of the frequency response of the output signal.

In an example method of adjusting at least one notch frequency of an adaptive notch filter to track at least one respective resonant frequency of a slow scan microelectromechanical systems (MEMS) mirror, one or more resonant frequencies of the slow scan MEMS mirror are determined based at least in part on a frequency response of an output signal that is proportional to movement of the slow scan MEMS mirror. The at least one notch frequency of one or more notch frequencies of the adaptive notch filter is adjusted to track the at least one respective resonant frequency of the one or more resonant frequencies of the slow scan MEMS mirror. A magnitude of a frequency response of a combination of the adaptive notch filter and the slow scan MEMS mirror is modified to be substantially constant by suppressing the at least one notch frequency in a frequency response of the slow scan MEMS mirror.

In a first aspect of the example method, the example method further comprises moving the slow scan MEMS mirror about a first axis, moving a fast scan MEMS mirror about a second axis that is perpendicular to the first axis, and reflecting light from the slow scan MEMS mirror and the fast scan MEMS mirror so that the slow scan MEMS mirror and the fast scan MEMS mirror collaboratively perform a raster scan of the light for display.

In a second aspect of the example method, the at least one notch frequency includes a first notch frequency. In accordance with the second aspect, the example method further comprises multiplying the frequency response of the output signal by a first window function having a center frequency that is less than the first notch frequency of the adaptive notch filter to provide a first windowed portion of the frequency response of the output signal. In further accordance with the second aspect, the example method further comprises multiplying the frequency response of the output signal by a second window function having a center frequency that is greater than the first notch frequency of the adaptive notch filter to provide a second windowed portion of the frequency response of the output signal. A first shape of the first window function and a second shape of the second window function are same. The first and second window functions are symmetrically oriented around the first notch frequency of the adaptive notch filter. In further accordance with the second aspect, the example method further comprises comparing the first windowed portion and the second windowed portion to determine whether the first notch frequency of the adaptive notch filter is to be adjusted. The first windowed portion having a magnitude that is greater than a magnitude of the second windowed portion indicates that the first notch frequency of the adaptive notch filter is to be incrementally decreased. The first windowed portion having a magnitude that is less than a magnitude of the second windowed portion indicates that the first notch frequency of the adaptive notch filter is to be incrementally increased.

In an example of the second aspect, the first notch frequency of the adaptive notch filter is tuned to match a first resonant frequency of the slow scan MEMS mirror. In accordance with this example, the example method further comprises multiplying the frequency response of the output signal by a third window function having a preset magnitude and having a center frequency that is less than the first notch frequency of the adaptive notch filter to provide a third windowed portion of the frequency response of the output signal. In further accordance with this example, the example method further comprises multiplying the frequency response of the output signal by a fourth window function having the preset magnitude and having a center frequency that is greater than the first notch frequency of the adaptive notch filter to provide a fourth windowed portion of the frequency response of the output signal. In further accordance with this example, the example method further comprises determining whether to adjust an amount of suppression of the first notch frequency by the adaptive notch filter based at least in part on magnitudes of the respective third and fourth windowed portions. Each of the magnitudes being greater than a first threshold that is based at least in part on an initial amount of suppression of the first notch frequency by the adaptive notch filter indicates that the amount of the suppression of the first notch frequency by the adaptive notch filter is to be increased. Each of the magnitudes being less than a second threshold that is based at least in part on the initial amount of suppression of the first notch frequency by the adaptive notch filter indicates that the amount of the suppression of the first notch frequency by the adaptive notch filter is to be decreased.

In a third aspect of the example method, determining the one or more resonant frequencies of the slow scan MEMS mirror comprises determining the one or more resonant frequencies of the slow scan MEMS mirror based at least in part on a comparison of a frequency response of a target trajectory that is configured to drive the slow scan MEMS mirror and the frequency response of the output signal that is proportional to the movement of the slow scan MEMS mirror in response to the target trajectory.

In a first example of the third aspect, the example method further comprises performing a fast Fourier transform on the target trajectory and the output signal to determine the respective frequency responses thereof. In accordance with this example, the example method further comprises determining a transfer function of a combination of the slow scan MEMS mirror and the adaptive notch filter based at least in part on a ratio of the frequency response of the output signal to the frequency response of the target trajectory.

In a first implementation of the first example of the third aspect, the example method further comprises adjusting a full-width half-maximum bandwidth of the adaptive notch filter to correspond to a full-width half-maximum bandwidth of a transfer function of the slow scan MEMS mirror.

In a second implementation of the first example of the third aspect, the example method further comprises adjusting an amount of suppression of the at least one notch frequency by the adaptive notch filter to correspond to an amplitude of the transfer function at the at least one notch frequency.

In a second example of the third aspect, the at least one notch frequency includes a first notch frequency corresponding to a first resonant frequency of the slow scan MEMS mirror. In accordance with this example, the example method further comprises performing a fast Fourier transform on the target trajectory and the output signal to determine the respective frequency responses thereof. In further accordance with this example, the example method further comprises generating a first compensating signal based at least in part on a magnitude difference between a magnitude of the frequency response of the target trajectory and a magnitude of the frequency response of the output signal. In further accordance with this example, the example method further comprises generating a second compensating signal based at least in part on a phase difference between a phase of the frequency response of the target trajectory and a phase of the frequency response of the output signal. In further accordance with this example, the example method further comprises performing an inverse fast Fourier transform on the first compensating signal and the second compensating signal to generate an updated driving signal that compensates for the magnitude difference and the phase difference.

In an implementation of the second example of the third aspect, generating the first compensating signal comprises using a first proportional-integral-derivative controller to generate the first compensating signal based at least in part on the magnitude difference between the magnitude of the frequency response of the target trajectory and the magnitude of the frequency response of the output signal. In accordance with this implementation, generating the second compensating signal comprises using a second proportional-integral-derivative controller to generate the second compensating signal based at least in part on the phase difference between the phase of the frequency response of the target trajectory and the phase of the frequency response of the output signal.

An example computer program product comprises a computer-readable storage medium having instructions recorded thereon for enabling a processor-based system to perform operations to adjust at least one notch frequency of an adaptive notch filter to track at least one respective resonant frequency of a slow scan microelectromechanical systems (MEMS) mirror. The operations comprise determine one or more resonant frequencies of the slow scan MEMS mirror based at least in part on a frequency response of an output signal that is proportional to movement of the slow scan MEMS mirror. The operations further comprise adjust the at least one notch frequency of one or more notch frequencies of the adaptive notch filter to track the at least one respective resonant frequency of the one or more resonant frequencies of the slow scan MEMS mirror. The operations further comprise modify a magnitude of a frequency response of a combination of the adaptive notch filter and the slow scan MEMS mirror to be substantially constant by suppressing the at least one notch frequency in a frequency response of the slow scan MEMS mirror.

IV. Example Computer System

FIG. 21 depicts an example computer 2100 in which embodiments may be implemented. The adaptive display control system 600 may be implemented using computer 2100, including one or more features of computer 2100 and/or alternative features. Computer 2100 may be a general-purpose computing device in the form of a conventional personal computer, a mobile computer, or a workstation, for example, or computer 2100 may be a special purpose computing device. For instance, computer 2100 may be a desktop computer, a laptop computer, a tablet computer, a wearable computer such as a smart watch or a head-mounted computer, a personal digital assistant, a cellular telephone, an Internet of things (IoT) device, or the like. The description of computer 2100 provided herein is provided for purposes of illustration, and is not intended to be limiting. Embodiments may be implemented in further types of computer systems, as would be known to persons skilled in the relevant art(s).

As shown in FIG. 21, computer 2100 includes a processing unit 2102, a system memory 2104, and a bus 2106 that couples various system components including system memory 2104 to processing unit 2102. Bus 2106 represents one or more of any of several types of bus structures, including a memory bus or memory controller, a peripheral bus, an accelerated graphics port, and a processor or local bus using any of a variety of bus architectures. System memory 2104 includes read only memory (ROM) 2108 and random access memory (RAM) 2110. A basic input/output system 2112 (BIOS) is stored in ROM 2108.

Computer 2100 also has one or more of the following drives: a hard disk drive 2114 for reading from and writing to a hard disk, a magnetic disk drive 2116 for reading from or writing to a removable magnetic disk 2118, and an optical disk drive 2120 for reading from or writing to a removable optical disk 2122 such as a CD ROM, DVD ROM, or other optical media. Hard disk drive 2114, magnetic disk drive 2116, and optical disk drive 2120 are connected to bus 2106 by a hard disk drive interface 2124, a magnetic disk drive interface 2126, and an optical drive interface 2128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2130, one or more application programs 2132, other program modules 2134, and program data 2136. Application programs 2132 or program modules 2134 may include, for example, computer program logic for implementing any one or more of the waveform generator 602, adaptive feedback 604, adaptive notch filter 606, adaptive feedback 900, first window logic 902a, second window logic 902b, first adder 904a, second adder 904b, combiner 906, decision logic 908, adaptive control logic 1800, first FFT logic 1820, first error compensator 1822, second FFT logic 1830, second error compensator 1832, IFFT logic 1840, flowchart 700 (including any step of flowchart 700), flowchart 800 (including any step of flowchart 800), flowchart 1300 (including any step of flowchart 1300), flowchart 1400 (including any step of flowchart 1400), and/or flowchart 1700 (including any step of flowchart 1700), as described herein.

A user may enter commands and information into the computer 2100 through input devices such as keyboard 2138 and pointing device 2140. Other input devices (not shown) may include a microphone, joystick, game pad, satellite dish, scanner, touch screen, camera, accelerometer, gyroscope, or the like. These and other input devices are often connected to the processing unit 2102 through a serial port interface 2142 that is coupled to bus 2106, but may be connected by other interfaces, such as a parallel port, game port, or a universal serial bus (USB).

A display device 2144 (e.g., a monitor) is also connected to bus 2106 via an interface, such as a video adapter 2146. In addition to display device 2144, computer 2100 may include other peripheral output devices (not shown) such as speakers and printers.

Computer 2100 is connected to a network 2148 (e.g., the Internet) through a network interface or adapter 2150, a modem 2152, or other means for establishing communications over the network. Modem 2152, which may be internal or external, is connected to bus 2106 via serial port interface 2142.

As used herein, the terms "computer program medium" and "computer-readable storage medium" are used to generally refer to media (e.g., non-transitory media) such as the hard disk associated with hard disk drive 2114, removable magnetic disk 2118, removable optical disk 2122, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 2132 and other program modules 2134) may be stored on the hard disk, magnetic disk, optical disk, ROM, or RAM. Such computer programs may also be received via network interface 2150 or serial port interface 2142. Such computer programs, when executed or loaded by an application, enable computer 2100 to implement features of embodiments discussed herein. Accordingly, such computer programs represent controllers of the computer 2100.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. An adaptive display control system comprising:
   a slow scan microelectromechanical systems (MEMS) mirror configured to move about an axis;
   adaptive feedback configured to determine one or more resonant frequencies of the slow scan MEMS mirror based at least in part on a frequency response of an output signal that is proportional to movement of the slow scan MEMS mirror, the adaptive feedback further configured to adjust at least one notch frequency of one or more notch frequencies of an adaptive notch filter to track at least one respective resonant frequency of the one or more resonant frequencies of the slow scan MEMS mirror; and
   the adaptive notch filter configured to modify a magnitude of a frequency response of a combination of the adaptive notch filter and the slow scan MEMS mirror to be substantially constant by suppressing the at least one notch frequency in a frequency response of the slow scan MEMS mirror.

2. The adaptable display control system of claim 1, further comprising:
   a FS MEMS mirror configured to move about an axis that is perpendicular to the axis about which the slow scan MEMS mirror is configured to move;
   wherein the slow scan MEMS mirror and a fast scan MEMS mirror are configured to collaboratively perform a raster scan of light for display.

3. The adaptive display control system of claim 1, wherein the at least one notch frequency includes a first notch frequency;
   wherein the adaptive feedback is configured to multiply the frequency response of the output signal by a first window function having a center frequency that is less than the first notch frequency of the adaptive notch filter to provide a first windowed portion of the frequency response of the output signal;
   wherein the adaptive feedback is configured to multiply the frequency response of the output signal by a second window function having a center frequency that is greater than the first notch frequency of the adaptive notch filter to provide a second windowed portion of the frequency response of the output signal;
   wherein a first shape of the first window function and a second shape of the second window function are same;
   wherein the first and second window functions are symmetrically oriented around the first notch frequency of the adaptive notch filter; and
   wherein the adaptive feedback is configured to compare the first windowed portion and the second windowed portion to determine whether the first notch frequency of the adaptive notch filter is to be adjusted, the first windowed portion having a magnitude that is greater than a magnitude of the second windowed portion indicating that the first notch frequency of the adaptive notch filter is to be incrementally decreased, the first windowed portion having a magnitude that is less than a magnitude of the second windowed portion indicating that the first notch frequency of the adaptive notch filter is to be incrementally increased.

4. The adaptive display control system of claim 3, wherein the first notch frequency of the adaptive notch filter is tuned to match a first resonant frequency of the slow scan MEMS mirror;
   wherein the adaptive feedback is configured to multiply the frequency response of the output signal by a third window function having a preset magnitude and having a center frequency that is less than the first notch frequency of the adaptive notch filter to provide a third windowed portion of the frequency response of the output signal;
   wherein the adaptive feedback is configured to multiply the frequency response of the output signal by a fourth window function having the preset magnitude and having a center frequency that is greater than the first notch frequency of the adaptive notch filter to provide a fourth windowed portion of the frequency response of the output signal; and
   wherein the adaptive feedback is configured to determine whether to adjust an amount of suppression of the first notch frequency by the adaptive notch filter based at least in part on magnitudes of the respective third and fourth windowed portions, each of the magnitudes being greater than a first threshold that is based at least in part on an initial amount of suppression of the first notch frequency by the adaptive notch filter indicating that the amount of the suppression of the first notch frequency by the adaptive notch filter is to be increased, each of the magnitudes being less than a second threshold that is based at least in part on the initial amount of suppression of the first notch frequency by the adaptive notch filter indicating that the amount of the suppression of the first notch frequency by the adaptive notch filter is to be decreased.

5. The adaptive display control system of claim 1, wherein the adaptive feedback is configured to determine the one or more resonant frequencies of the slow scan MEMS mirror based at least in part on a comparison of a frequency response of a target trajectory that is configured to drive the slow scan MEMS mirror and the frequency response of the output signal that is proportional to the movement of the slow scan MEMS mirror in response to the target trajectory.

6. The adaptive display control system of claim 5, wherein the adaptive feedback is configured to perform a fast Fourier transform on the target trajectory and the output signal to determine the respective frequency responses thereof; and
wherein the adaptive feedback is configured to determine a transfer function of a combination of the slow scan MEMS mirror and the adaptive notch filter based at least in part on a ratio of the frequency response of the output signal to the frequency response of the target trajectory.

7. The adaptive display control system of claim 6, wherein the adaptive feedback is further configured to adjust a full-width half-maximum bandwidth of the adaptive notch filter to correspond to a full-width half-maximum bandwidth of a transfer function of the slow scan MEMS mirror.

8. The adaptive display control system of claim 6, wherein the adaptive feedback is further configured to adjust an amount of suppression of the at least one notch frequency by the adaptive notch filter to correspond to an amplitude of the transfer function at the at least one notch frequency.

9. The adaptive display control system of claim 5, wherein the at least one notch frequency includes a first notch frequency corresponding to a first resonant frequency of the slow scan MEMS mirror;
wherein the adaptive feedback is configured to perform a fast Fourier transform on the target trajectory and the output signal to determine the respective frequency responses thereof;
wherein the adaptive feedback is configured to generate a first compensating signal based at least in part on a magnitude difference between a magnitude of the frequency response of the target trajectory and a magnitude of the frequency response of the output signal;
wherein the adaptive feedback is configured to generate a second compensating signal based at least in part on a phase difference between a phase of the frequency response of the target trajectory and a phase of the frequency response of the output signal; and
wherein the adaptive notch filter is configured to perform an inverse fast Fourier transform on the first compensating signal and the second compensating signal to generate an updated driving signal that compensates for the magnitude difference and the phase difference.

10. The adaptive display control system of claim 9, wherein the adaptive feedback comprises:
a first proportional-integral-derivative controller configured to generate the first compensating signal based at least in part on the magnitude difference between the magnitude of the frequency response of the target trajectory and the magnitude of the frequency response of the output signal; and
a second proportional-integral-derivative controller configured to generate the second compensating signal based at least in part on the phase difference between the phase of the frequency response of the target trajectory and the phase of the frequency response of the output signal.

11. A method of adjusting at least one notch frequency of an adaptive notch filter to track at least one respective resonant frequency of a slow scan microelectromechanical systems (MEMS) mirror, the method comprising:
determining one or more resonant frequencies of the slow scan MEMS mirror based at least in part on a frequency response of an output signal that is proportional to movement of the slow scan MEMS mirror;
adjusting the at least one notch frequency of one or more notch frequencies of the adaptive notch filter to track the at least one respective resonant frequency of the one or more resonant frequencies of the slow scan MEMS mirror; and
modifying a magnitude of a frequency response of a combination of the adaptive notch filter and the slow scan MEMS mirror to be substantially constant by suppressing the at least one notch frequency in a frequency response of the slow scan MEMS mirror.

12. The method of claim 11, further comprising:
moving the slow scan MEMS mirror about a first axis;
moving a fast scan MEMS mirror about a second axis that is perpendicular to the first axis; and
reflecting light from the slow scan MEMS mirror and the fast scan MEMS mirror so that the slow scan MEMS mirror and the fast scan MEMS mirror collaboratively perform a raster scan of the light for display.

13. The method of claim 11, wherein the at least one notch frequency includes a first notch frequency; and
wherein the method further comprises:
multiplying the frequency response of the output signal by a first window function having a center frequency that is less than the first notch frequency of the adaptive notch filter to provide a first windowed portion of the frequency response of the output signal;
multiplying the frequency response of the output signal by a second window function having a center frequency that is greater than the first notch frequency of the adaptive notch filter to provide a second windowed portion of the frequency response of the output signal, a first shape of the first window function and a second shape of the second window function are same, the first and second window functions are symmetrically oriented around the first notch frequency of the adaptive notch filter; and
comparing the first windowed portion and the second windowed portion to determine whether the first notch frequency of the adaptive notch filter is to be adjusted, the first windowed portion having a magnitude that is greater than a magnitude of the second windowed portion indicating that the first notch frequency of the adaptive notch filter is to be incrementally decreased, the first windowed portion having a magnitude that is less than a magnitude of the second windowed portion indicating that the first notch frequency of the adaptive notch filter is to be incrementally increased.

14. The method of claim 13, wherein the first notch frequency of the adaptive notch filter is tuned to match a first resonant frequency of the slow scan MEMS mirror; and
wherein the method further comprises:
multiplying the frequency response of the output signal by a third window function having a preset magnitude and having a center frequency that is less than the first notch frequency of the adaptive notch filter to provide a third windowed portion of the frequency response of the output signal;

multiplying the frequency response of the output signal by a fourth window function having the preset magnitude and having a center frequency that is greater than the first notch frequency of the adaptive notch filter to provide a fourth windowed portion of the frequency response of the output signal; and determining whether to adjust an amount of suppression of the first notch frequency by the adaptive notch filter based at least in part on magnitudes of the respective third and fourth windowed portions, each of the magnitudes being greater than a first threshold that is based at least in part on an initial amount of suppression of the first notch frequency by the adaptive notch filter indicating that the amount of the suppression of the first notch frequency by the adaptive notch filter is to be increased, each of the magnitudes being less than a second threshold that is based at least in part on the initial amount of suppression of the first notch frequency by the adaptive notch filter indicating that the amount of the suppression of the first notch frequency by the adaptive notch filter is to be decreased.

15. The method of claim 11, wherein determining the one or more resonant frequencies of the slow scan MEMS mirror comprises:

determining the one or more resonant frequencies of the slow scan MEMS mirror based at least in part on a comparison of a frequency response of a target trajectory that is configured to drive the slow scan MEMS mirror and the frequency response of the output signal that is proportional to the movement of the slow scan MEMS mirror in response to the target trajectory.

16. The method of claim 15, further comprising:

performing a fast Fourier transform on the target trajectory and the output signal to determine the respective frequency responses thereof; and determining a transfer function of a combination of the slow scan MEMS mirror and the adaptive notch filter based at least in part on a ratio of the frequency response of the output signal to the frequency response of the target trajectory.

17. The method of claim 16, further comprising at least one of the following:

adjusting a full-width half-maximum bandwidth of the adaptive notch filter to correspond to a full-width half-maximum bandwidth of a transfer function of the slow scan MEMS mirror;

adjusting an amount of suppression of the at least one notch frequency by the adaptive notch filter to correspond to an amplitude of the transfer function at the at least one notch frequency.

18. The method of claim 15, wherein the at least one notch frequency includes a first notch frequency corresponding to a first resonant frequency of the slow scan MEMS mirror; and wherein the method further comprises:

performing a fast Fourier transform on the target trajectory and the output signal to determine the respective frequency responses thereof;

generating a first compensating signal based at least in part on a magnitude difference between a magnitude of the frequency response of the target trajectory and a magnitude of the frequency response of the output signal;

generating a second compensating signal based at least in part on a phase difference between a phase of the frequency response of the target trajectory and a phase of the frequency response of the output signal; and performing an inverse fast Fourier transform on the first compensating signal and the second compensating signal to generate an updated driving signal that compensates for the magnitude difference and the phase difference.

19. The method of claim 18, wherein generating the first compensating signal comprises:

using a first proportional-integral-derivative controller to generate the first compensating signal based at least in part on the magnitude difference between the magnitude of the frequency response of the target trajectory and the magnitude of the frequency response of the output signal; and wherein generating the second compensating signal comprises:

using a second proportional-integral-derivative controller to generate the second compensating signal based at least in part on the phase difference between the phase of the frequency response of the target trajectory and the phase of the frequency response of the output signal.

20. A computer program product comprising a computer-readable storage medium having instructions recorded thereon for enabling a processor-based system to perform operations to adjust at least one notch frequency of an adaptive notch filter to track at least one respective resonant frequency of a slow scan microelectromechanical systems (MEMS) mirror, the operations comprising:

determine one or more resonant frequencies of the slow scan MEMS mirror based at least in part on a frequency response of an output signal that is proportional to movement of the slow scan MEMS mirror;

adjust the at least one notch frequency of one or more notch frequencies of the adaptive notch filter to track the at least one respective resonant frequency of the one or more resonant frequencies of the slow scan MEMS mirror; and modify a magnitude of a frequency response of a combination of the adaptive notch filter and the slow scan MEMS mirror to be substantially constant by suppressing the at least one notch frequency in a frequency response of the slow scan MEMS mirror.

* * * * *